United States Patent
Jia et al.

(10) Patent No.: US 11,553,531 B2
(45) Date of Patent: Jan. 10, 2023

(54) CONTENTION WINDOW MANAGEMENT METHOD AND SENDING DEVICE

(71) Applicant: HUAWEI TECHNOLOGIES CO., LTD., Shenzhen (CN)

(72) Inventors: Qiong Jia, Shanghai (CN); Jun Zhu, Shenzhen (CN); Ji Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 16/991,227

(22) Filed: Aug. 12, 2020

(65) Prior Publication Data
US 2020/0374940 A1 Nov. 26, 2020

Related U.S. Application Data

(63) Continuation of application No. PCT/CN2019/072869, filed on Jan. 23, 2019.

(30) Foreign Application Priority Data

Feb. 14, 2018 (CN) .......................... 201810152389.X
Sep. 5, 2018 (CN) ........................... 201811031772.6

(51) Int. Cl.
*H04L 1/18* (2006.01)
*H04W 74/08* (2009.01)
*H04W 16/14* (2009.01)

(52) U.S. Cl.
CPC ....... *H04W 74/0833* (2013.01); *H04L 1/1812* (2013.01); *H04W 16/14* (2013.01)

(58) Field of Classification Search
CPC ... H04W 28/04; H04W 72/04; H04W 72/042; H04W 88/08; H04W 74/0833; H04W 16/14; H04L 5/0007; H04L 1/1812
(Continued)

(56) References Cited

U.S. PATENT DOCUMENTS

2018/0242360 A1 8/2018 Noh et al.
2019/0150194 A1* 5/2019 Kim ......................... H04L 5/00
                                                                    370/329
(Continued)

FOREIGN PATENT DOCUMENTS

CN      102802171 A  * 11/2012  ........ H04W 74/0825
CN      104254137 A  * 12/2014  ............ H04W 74/08
(Continued)

OTHER PUBLICATIONS

3GPP TS 36.213 V15.2.0 (Oct. 1, 2018);3rd Generation Partnership Project;Technical Specification Group Radio Access Network;Evolved Universal Terrestrial Radio Access (E-UTRA);Physical layer procedures(Release 15);total 493 pages.

*Primary Examiner* — Peter G Solinsky
*Assistant Examiner* — Sanjay K Dewan
(74) *Attorney, Agent, or Firm* — Rimon PC

(57) ABSTRACT

Embodiments of this application provide a contention window management method applied to an unlicensed band. The method includes sending, by a sending device, one or more data packets to one or more receiving devices in one reference time unit or a plurality of reference time units, where the one or more data packets occupy a first bandwidth. The method further includes receiving, by the sending device from the one or more receiving devices, a hybrid automatic repeat request HARQ or HARQs for the one or more data packets. The sending device determines a contention window (CW) size of a second bandwidth with reference to the HARQ or HARQs. The CW update based on HARQ feedback improves communication efficiency.

20 Claims, 16 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0253200 A1* | 8/2019 | Salem | H04L 1/1819 |
| 2020/0162203 A1* | 5/2020 | Bang | H04L 1/1822 |
| 2020/0220693 A1* | 7/2020 | Babaei | H04L 1/1671 |
| 2021/0160011 A1* | 5/2021 | Bang | H04L 1/1812 |

FOREIGN PATENT DOCUMENTS

| | | | | |
|---|---|---|---|---|
| CN | 105338652 A | * | 2/2016 | H04W 74/085 |
| CN | 106304386 A | * | 1/2017 | H04W 74/085 |
| CN | WO2017045105 A1 | * | 3/2017 | H04W 74/002 |
| CN | 106559909 A | * | 4/2017 | H04W 74/08 |
| CN | 106656430 A | * | 5/2017 | H04W 24/02 |
| CN | 107580801 A | * | 1/2018 | H04L 1/1887 |
| CN | 107624265 A | * | 1/2018 | H04W 74/08 |
| CN | 107637158 A | | 1/2018 | |
| CN | 107637158 A | * | 1/2018 | H04L 5/0055 |
| EP | 3297192 A1 | | 3/2018 | |
| KR | WO2016182366 A1 | * | 11/2016 | H04L 1/1887 |
| KR | WO2017074160 A1 | * | 5/2017 | H04W 74/0808 |
| KR | 3 297 192 A1 | * | 3/2018 | H04L 1/18 |
| WO | 2016182366 A1 | | 11/2016 | |
| WO | 2017045105 A1 | | 3/2017 | |
| WO | 2017069798 A1 | | 4/2017 | |
| WO | 2017074160 A1 | | 5/2017 | |

* cited by examiner

CONTENTION WINDOW MANAGEMENT METHOD AND SENDING DEVICE

CROSS-REFERENCE TO RELATED APPLICATIONS

This application is a continuation of International Application No. PCT/CN2019/072869, filed on Jan. 23, 2019, which claims priority to Chinese Patent Application No. 201811031772.6, filed on Sep. 5, 2018 and Chinese Patent Application No. 201810152389.X, filed on Feb. 14, 2018, all of which are hereby incorporated by reference in their entireties.

TECHNICAL FIELD

Embodiments of this application relate to the communications field, and more specifically, to a technology for updating a contention window on an unlicensed band.

BACKGROUND

With rapid development of wireless communications technologies, spectrum resources are becoming increasingly scarce. This encourages expansion into unlicensed bands. 3GPP Release 13 (Release 13, R-13) and Release 14 (Release 14, R-14) introduce a licensed assisted access (LAA) technology and an enhanced licensed assisted access (eLAA) technology respectively, to make full use of unlicensed spectrum resources with the assistance of a licensed spectrum.

In a communications system deployed on an unlicensed band, radio resources are usually used or shared through contention. To ensure fairness, a device that performs transmission on the unlicensed band usually needs to comply with a listen before talk (LBT) rule. In other words, the device needs to sense a channel before sending a signal, and starts transmission when the channel is idle and a channel occupancy time is obtained.

In a 5th generation (5G) new radio (NR) system, application of an unlicensed band is still a technical means of meeting a service requirement and improving user experience. In the prior art, for category 4 LBT (Cat 4 LBT, which is also referred to as type 1 LBT in some standards), after sensing a channel to be idle in a duration Td, a sending device further needs to perform random backoff for a corresponding quantity of times based on a random backoff number, to avoid collision. During initialization, a random value is usually selected from 0 to a contention window CW as the random backoff number. The CW is dynamically updated with a channel status. As transmission resource division becomes finer in 5G NR, how to determine the CW more accurately becomes an urgent problem to be resolved.

SUMMARY

To more accurately update a contention window CW, embodiments of this application provide a contention window management method and apparatus applied to an unlicensed band.

According to a first aspect, an embodiment of this application provides a contention window management method, including: sending, by a sending device, one or more data packets to one or more receiving devices in one reference time unit or a plurality of reference time units, where the one or more data packets occupy a first bandwidth; receiving, by the sending device from the one or more receiving devices, a hybrid automatic repeat request HARQ or HARQs for the one or more data packets; and determining, by the sending device, a contention window CW size of a second bandwidth with reference to the HARQ or HARQs for the one or more data packets.

According to the method provided in this application, contention window CW update can be determined based on a HARQ feedback for a data packet, to improve communication efficiency.

In a possible design, the determining, by the sending device, a contention window CW size of a second bandwidth with reference to the HARQ or HARQs for the one or more data packets includes:

determining the contention window CW size of the second bandwidth based on a proportion Z of NACKs or ACKs in the HARQ or HARQs for the one or more data packets.

In another possible design, the hybrid automatic repeat request HARQ or HARQs for the one or more data packets includes or include one or a combination of the following:

a transport block HARQ TB HARQ or TB HARQs corresponding to one or more first data packets, or one or more code block group HARQs CBG HARQs corresponding to one or more second data packets.

In a possible design, the proportion Z satisfies the following formula:

$$Z = \frac{NACK_{TB} + \sum_{x} Z'}{N_{TB}}, \quad Z' = \frac{NACK_{CBG}}{N_{CBG}}.$$

Z' represents a proportion of CBGs for which negative acknowledgements NACKs are fed back and that are in one TB. $N_{CBG}$ represents a quantity of CBGs in the TB. $NACK_{CBG}$ represents a quantity of CBGs for which NACKs are fed back and that are in the TB. $NACK_{TB}$ represents a quantity of TBs for which NACKs are fed back and that are transmitted in the one reference time unit or the plurality of reference time units. $N_{TB}$ represents a quantity of TBs transmitted in the one reference time unit or the plurality of reference time units. x represents a quantity of TBs transmitted based on CBGs in the one reference time unit or the plurality of reference time units.

In a possible design, the proportion Z satisfies the following formula:

$$Z = \frac{NACK_{TB} + \sum_{x} Z'}{N_{TB}}.$$

$NACK_{TB}$ represents a quantity of TBs whose smallest feedback units are TBs and for which NACKs are fed back and that are transmitted in the one reference time unit or the plurality of reference time units. $N_{TB}$ represents a total quantity of TBs transmitted in the one reference time unit or the plurality of reference time units. x represents a quantity of TBs whose smallest feedback units are CBGs and that are transmitted in the one reference time unit or the plurality of reference time units.

$$Z' = \frac{\alpha \cdot NACK_{CBG} + \beta \cdot N_{NACK}}{\alpha \cdot N_{CBG} + \beta}.$$

Z' represents a proportion of NACKs for one TB. $N_{GBG}$ represents a quantity of CBGs in the TB. $NACK_{CBG}$ represents a quantity of CBGs for which NACKs are fed back and that are in the TB. $N_{NACK}$ is used to represent a TB-based HARQ feedback for the TB. If the TB-based HARQ feedback for the TB is a NACK, $N_{NACK}=1$. If the TB-based HARQ feedback for the TB is an ACK, $N_{NACK}=0$. Optionally, α and β represent weighting factors of a CBG-based HARQ feedback and a TB-based HARQ feedback respectively. Optionally, α+β=1. For example, values of α and β may be 0 and 1 respectively.

In another possible design, $$Z' = \frac{\alpha \cdot NACK_{CBG}}{\alpha \cdot N_{CBG}} + \beta \cdot N_{NACK}.$$

Z' represents a proportion of NACKs for one TB. $N_{CBG}$ represents a quantity of CBGs in the TB. $NACK_{CBG}$ represents a quantity of CBGs for which NACKs are fed back and that are in the TB. $N_{NACK}$ is used to represent a TB-based HARQ feedback for the TB. If the TB-based HARQ feedback for the TB is a NACK, $N_{NACK}=1$. Otherwise, $N_{NACK}=0$. Optionally, α and β represent weighting factors of a CBG-based HARQ feedback and a TB-based HARQ feedback respectively. Optionally, α+β=1. For example, values of α and β may be 0 and 1 respectively.

In another possible design, the determining a contention window CW size of a second bandwidth with reference to the HARQ or HARQs for the one or more data packets includes:

determining the contention window CW size of the second bandwidth with reference to the HARQ or HARQs for the one or more data packets sent in the one reference time unit, where the one reference time unit is a start time unit of a latest transmission performed by the sending device.

In a possible design, the determining a contention window CW size of a second bandwidth with reference to the HARQ or HARQs for the one or more data packets includes:

determining the contention window CW size of the second bandwidth with reference to the HARQ or HARQs for the one or more data packets sent in the plurality of reference time units, where the HARQ or HARQs for the one or more data packets includes or include the HARQ or HARQs for the one or more data packets sent in the latest plurality of reference time units on non-overlapping frequency domain units.

In a possible design, the hybrid automatic repeat request HARQ or HARQs for the one or more data packets includes or include only the TB HARQ or TB HARQs for the one or more first data packets, and the proportion Z satisfies the following formula:

$$Z = \frac{NACK_{TB}}{N_{TB}},$$

where $NACK_{TB}$ represents a quantity of TBs for which NACKs are fed back and that are transmitted in the one reference time unit or one of the plurality of reference time units, and $N_{TB}$ represents a quantity of TBs transmitted in the one reference time unit or one of the plurality of reference time units.

In a possible design, the hybrid automatic repeat request HARQ or HARQs for the one or more data packets includes or include only the CBG HARQ or CBG HARQs for the one or more second data packets, and the proportion Z satisfies the following formula:

$$Z = \frac{NACK_{CBG}}{N_{CBG}},$$

where $N_{CBG}$ represents a quantity of CBGs transmitted in the one reference time unit or the plurality of reference time units, and $NACK_{CBG}$ represents a quantity of CBGs for which NACKs are fed back.

According to the contention window adjustment method provided in this application, when channel quality is relatively poor, increasing a contention window value enables the sending device to perform backoff in a longer time. This avoids interference caused by collision. When channel quality is relatively good, re-initializing or decreasing a contention window enables the sending device to complete backoff in a short time. This reduces a channel access time.

According to a second aspect, an embodiment of this application provides a contention window management apparatus, applied to a network device, including a unit or means (means) for performing the steps in the first aspect.

According to a third aspect, an embodiment of this application provides a contention window management apparatus, applied to a terminal device, including a unit or means (means) for performing the steps in the first aspect.

According to a fourth aspect, this application provides a communications apparatus, including a processor and a memory, where the memory is configured to store a computer-executable instruction, and the processor is configured to execute the computer-executable instruction stored in the memory, to enable the communications apparatus to perform the method according to the first aspect.

According to a fifth aspect, this application provides a computer-readable storage medium, where the computer-readable storage medium stores an instruction, and when the instruction is run on a computer, the computer is enabled to perform the method according to the first aspect.

According to a sixth aspect, this application provides a chip, where the chip is connected to a memory, and is configured to read and execute a software program stored in the memory, to implement the method according to the first aspect.

According to a seventh aspect, this application provides a communications system, where the communications system includes the network device according to the second aspect and the terminal device according to the third aspect.

DESCRIPTION OF EMBODIMENTS

The following clearly describes the technical solutions in the embodiments of this application with reference to the accompanying drawings in the embodiments of this application. A specific operation method in a method embodiment may also be applied to an apparatus embodiment or a system embodiment.

Figure 1:
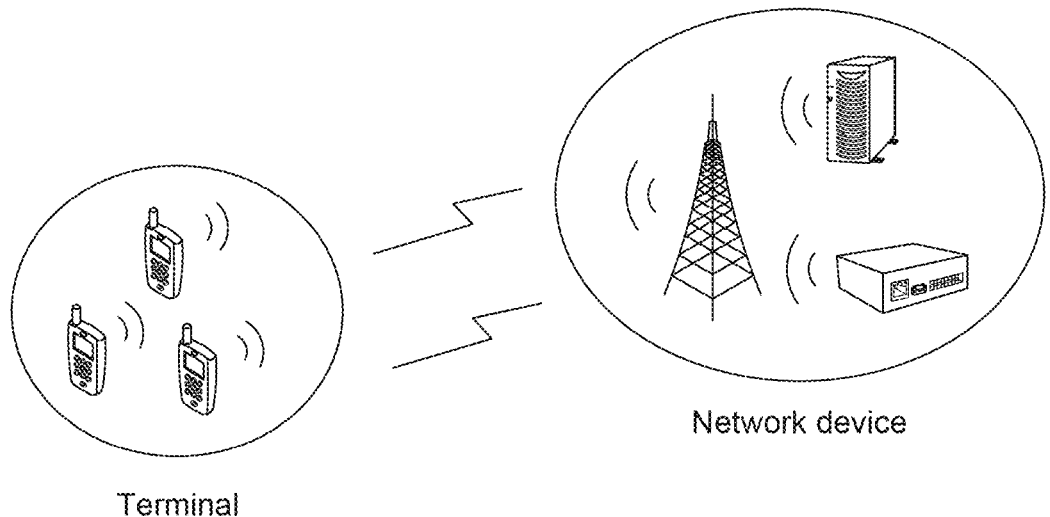
FIG. 1 is a schematic diagram of an architecture of a communications system according to an embodiment of this application.

FIG. 1 is a simplified schematic diagram of a network architecture to which an embodiment of this application is applied. The network architecture may be a network architecture of a wireless communications system. The wireless communications system may operate on a licensed band or on an unlicensed band. It may be understood that, the unlicensed band may be used, to improve a capacity of the wireless communications system, channel access efficiency, and spectrum resource utilization, and eventually to improve system performance.

As shown in FIG. 1, the wireless communications system may include a network device and a terminal. The network device and the terminal are connected using a wireless communications technology. It should be noted that, quantities and forms of the terminal and the network device that are shown in FIG. 1 do not constitute a limitation on the embodiments of this application. In different embodiments, one wireless communications system may include one or more network devices, and one network device may be connected to one or more terminals. The network device may be further connected to a core network device. The core network device is not shown in FIG. 1.

It should be noted that, the wireless communications system mentioned in the embodiments of this application includes but is not limited to a narrowband internet of things (NB-IoT) system, a global system for mobile communications (GSM), an enhanced data rates for GSM evolution (EDGE) system, a wideband code division multiple access (WCDMA) system, a code division multiple access (CDMA) 2000 system, a time division-synchronous code division multiple access (TD-SCDMA) system, a long term evolution (LTE) system, a 5th generation mobile communications system, and a future mobile communications system.

In the embodiments of this application, the network device is an apparatus that is deployed in a radio access network to provide a wireless communication function for the terminal. The network device may include but is not limited to a base station (BS), a station (STA, including an access point (AP) and a non-AP station STA), a network controller, a transmission reception point (TRP), a mobile switching center, a Wi-Fi access point, or the like. For example, an apparatus that directly communicates with the terminal through a radio channel is usually the base station. The base station may include various forms of macro base stations, micro base stations, relay nodes, access points, remote radio units (RRU), or the like. Certainly, the apparatus that performs wireless communication with the terminal may alternatively be another network device that has a wireless communication function. This is not uniquely limited in this application. It should be noted that in different systems, a device with a base station function may have different names. For example, in an LTE network, the device is referred to as an evolved NodeB (eNB or eNodeB). In a 3rd generation (3G) network, the device is referred to as a NodeB (NodeB) or the like. In a 5G network, the device is referred to as a gNodeB (gNB).

The terminal is also referred to as a terminal device, and may include, for example, user equipment (UE), a mobile station (MS), or a mobile terminal (MT). The terminal is a device that provides voice and/or data connectivity to a user. For example, the terminal is a handheld device, a vehicle-mounted device, a wearable device, or a computing device that has a wireless connection function, or another processing device connected to a wireless modem. Currently, some examples of the terminal are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self driving, a wireless terminal in a remote surgery, a wireless terminal in a smart grid, a wireless terminal in transportation safety, a wireless terminal in a smart city, a wireless terminal in a smart home, or the like.

In this application, the terms "network" and "system" may be interchangeably used, and the terms "user" and "terminal" may also be interchangeably used, but a person skilled in the art can understand meanings of the terms. In addition, some English abbreviations in the LTE system are used as examples in this specification to describe the embodiments of this application, and may change with network evolution. For specific evolution, refer to a description in a corresponding standard.

The terms "system" and "network" may be used interchangeably in this specification. In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following" or a similar expression thereof indicates any combination of the items, and includes any combination of singular items or plural items. For example, at least one of a, b, or c may indicate a, or b, or c, or a and b, or a and c, or b and c, or a, b, and c, where a, b, and c may be singular or plural.

According to a contention window management method that is applied to an unlicensed band and is provided in this application, a contention window (CW) update mechanism in channel sensing is proposed based on a more flexible resource transmission unit in an NR system, to more accurately update a contention window. The following describes, by using examples, the contention window management method in this application from perspectives of a resource transmission unit and a contention window for channel sensing.

In a communications system, after a sending device sends one or more data packets to a receiving device, the receiving device needs to feed back a hybrid automatic repeat request (HARQ) or HARQs to the sending device. Therefore, the sending device determines whether transmission is correct, and retransmits, if necessary, a data packet that is incorrectly transmitted. The sending device or the receiving device may be a network device or a terminal. When the sending device is a network device, the receiving device is a terminal. For example, in downlink transmission, the network device may send one or more data packets to one or more terminals in one reference time unit or a plurality of reference time units. When the sending device is a terminal, the receiving device is a network device. For example, in uplink transmission, the terminal may send one or more data packets to one network device in one reference time unit or a plurality of reference time units.

A basic unit that is for receiving and/or for performing HARQ feedback and that is specified in the communications system is used as a basic unit for performing HARQ feedback by the receiving device or performing retransmission by the sending device. For example, in an LTE system, a data packet is transmitted in a transport block (TB). When a receiving device finds that a TB is not successfully received, the receiving device may feedback, to a sending device, a NACK for the TB that is not successfully received. After receiving the NACK for the TB, the sending device retransmits, in subsequent transmission, the TB that is not successfully received. This TB-based HARQ feedback mechanism may be referred to as TB-acknowledgement (TB-ACK).

In an NR system, data receiving and/or HARQ feedback may be performed based on a smaller unit. For example, a data packet may further include one or more code blocks. A CB can be independently checked. For example, cyclic redundancy check (CRC) coding is performed on each CB. Therefore, after decoding each CB, a receiving device may determine, by performing CRC check, whether the CB is correctly decoded. One TB may be divided into K code block groups (CBG), where K≥1, and one CBG includes at least one CB. HARQ feedback is performed based on a CBG. In other words, the receiving device may feedback a HARQ based on one CBG. When a HARQ or HARQs corresponding to one or more CBGs in one TB is or are a NACK or NACKs, or DTX, it indicates that the TB is not correctly received. When performing retransmission, a sending device may transmit only one or more CBGs in the TB that are not correctly received, and may not retransmit a CBG that has been correctly received. This CBG-based HARQ feedback mechanism may be referred to as CBG-acknowledgement (CBG-ACK).

It should be noted that, in the NR system, both the TB-based HARQ feedback mechanism and the CBG-based HARQ feedback mechanism may be supported.

In the LTE system, a subcarrier spacing of a data channel is fixed at 15 kHz. In the 5G NR system, to use resources more flexibly and support more diversified communication environments, a plurality of optional subcarrier spacings may be supported, including 15 kHz, 30 kHz, 60 kHz, and the like. A larger subcarrier spacing corresponds to a smaller length of an uplink symbol. A length that is of a symbol and that corresponds to a subcarrier spacing of 15 kHz×2n (n is a positive integer) is $$\frac{1}{2^n}$$

of a length that is of a symbol and that corresponds to an original subcarrier spacing of 15 kHz. Correspondingly, a length of one slot (slot) or a length of one transmission time interval (transmission time interval, TTI) corresponding to one data packet is $$\frac{1}{2^n}$$

of an original length of the slot or an original length of the TTI corresponding to the data packet.

To extend an available band, a carrier aggregation (CA) technology is introduced to the LTE system, to use a plurality of carriers to transmit data information. Each carrier (referred to as a component carrier (CC)) carries one or more transport blocks (TB). Downlink/uplink data transmission on each carrier is scheduled by using corresponding scheduling signaling (DL grant/UL grant) sent by an access network device. The carrier and a carrier carrying the scheduling signaling may be a same carrier (self-carrier scheduling), or may be different carriers (cross-carrier scheduling).

In the 5G NR system, in addition to data transmission in a carrier aggregation manner, a wideband (WB) transmission technology may also be supported. A bandwidth occupied by one carrier is extended, for example, from 20 MHz in the original LTE system to N*20 MHz. In addition, to reduce complexity of fast Fourier transform or inverse fast Fourier transform (FFT or IFFT), a subcarrier spacing may be increased. For example, the subcarrier spacing is increased from 15 kHz in the original LTE system to N*15 kHz, to maintain a sampling rate unchanged while increasing a bandwidth. For example, a bandwidth occupied by one carrier one carrier in an NR broadband system is extended to 40 MHz. The carrier includes two subbands (SubBand), and each subband has a bandwidth of 20 MHz. One physical resource block (PRB) of the subband includes 12 subcarriers, and a subcarrier spacing is 30 kHz. One subframe of the NR broadband system includes 14 time domain symbols. A length of each time domain symbol is ½ of a length of an LTE (a subcarrier spacing is 15 kHz) time domain symbol, and the subframe has a length of 0.5 ms. One transport block may be carried on a time-frequency resource of a 40 MHz*0.5 ms.

To resolve a problem that there is a relatively small amount of available frequency domain resources on a licensed band, LTE Release 13 introduces a licensed-assisted access using long term evolution (LAA-LTE) technology, and Release 14 introduces an enhanced licensed-assisted access (eLAA) technology. An available band can be extended to a license-exempt band using the carrier aggregation technology. Downlink and uplink information can be transmitted on the license-exempt band with the assistance of the licensed band. In the Multefire standard, based on the LAA technology and the eLAA technology, uplink and downlink transmission (including a traffic channel and a control channel) of an LTE system is all implemented on a license-exempt band without the assistance of a licensed band. In other words, standalone transmission is implemented.

To implement friendly coexistence with an access network device and a terminal device that are of a different operator, and an inter-RAT radio node such as Wi-Fi access node on a license-exempt band, an LAA/eLAA/Multefire system uses an LBT channel access mechanism. A sending device needs to sense a channel before sending information on the license-exempt band, and sends downlink information after sensing the channel to be idle. If the sending device senses a channel to be idle before the sending node wants to occupy a resource, it is referred to as an LBT success; If the sending node senses a channel to be busy before the sending node wants to occupy a resource, it is referred to as an LBT failure.

After occupying a channel, a sending device may continuously occupy the channel to send information. A continuously-occupied time domain resource is referred to as a burst. A maximum time length for which the sending device may continuously send information after occupying the channel is a maximum channel occupancy time (MCOT). After continuously occupying the channel for the MCOT, the sending device needs to release the channel, and perform LBT again to re-access the channel. When the sending device performs channel sensing, there are two channel states: an idle state and a busy state. A criterion for determining a channel state is as follows: A wireless communications device compares a power received received on a channel in a sensing slot with a clear channel assessment-energy detection (CCA-ED) threshold. If the power is greater than the detection threshold, the channel is in the busy state. If the power is less than the detection threshold, the channel is in the idle state.

A sending device operating on an unlicensed band may access a channel by using a random backoff CCA (CCA) mechanism. In other words, a network device may access the channel by using the random backoff CCA mechanism to send downlink information, and a terminal may access the channel by using the random backoff CCA mechanism to send uplink information. The random backoff CCA mechanism may be referred to as type 1 channel access (Type 1 channel access). After sensing the channel to be idle in a duration Td, the sending device further needs to perform random backoff. The sending device can perform transmission only after the sending device completes random backoff. Specifically, after sensing the channel to be idle in the duration Td, the sending device performs random backoff according to the following steps:

Step 1: During initialization, select a random value uniformly distributed between 0 and a CW as an initial value $N_{init}$, and go to step 4.

Step 2: Determine whether N is greater than 0, and if N is greater than 0, set N=N-1.

Step 3: Sense the channel in a backoff slot, and if the channel is sensed to be idle, go to step 4; or if the channel is sensed to be busy, go to step 5.

Step 4: If N is equal to 0, stop; or if N is not equal to 0, perform step 2.

Step 5: Sense the channel until either the channel is occupied in a duration $T_d$ or the channel is sensed to be idle in a duration $T_d$.

Step 6: If the channel is idle in all backoff slots of the additional $T_d$, perform step 4; or if the channel is idle in some or none of backoff slots in the additional $T_d$, perform step 5.

In addition, after a backoff counter is reset to zero, the sending device may wait for a period of time instead of immediately sending information. After the sending device completes waiting, the sending device senses the channel once in an additional slot before a moment at which the information needs to be sent. If the channel is sensed to be idle in the additional slot, it is considered that channel sensing succeeds, and the sending device can immediately send the information. If the backoff counter is not reset to zero before the moment at which the information needs to be sent, or the channel is sensed to be busy in the additional slot, it is considered that channel sensing fails. The sending device is a terminal device or an access network device. A corresponding MCOT for the access network device after the access network device successfully performs random backoff CCA is a DL MCOT. A corresponding MCOT for the terminal device after the terminal device successfully performs random backoff CCA is an UL MCOT.

In the random backoff process, CW is short for contention window. A length of the contention window is also referred to as a contention window size (CWS).

To make a trade-off between friendly coexistence with a neighboring node on a license-exempt band and improvement of channel access efficiency, the sending device may dynamically adjust the CWS and use an adjusted CWS for next channel sensing. Specifically, before sending information, the sending device determines a reference time unit in which the sending device has sent a data packet, and dynamically adjusts a CWS based on a HARQ response (also referred to as a HARQ acknowledgement (HARQ-ACK), HARQ information, a HARQ feedback, a HARQ acknowledgement feedback, a HARQ receiving state, or the like) that is fed back by a receiving device and is for the data packet sent in the reference time unit. The receiving device feeds back the HARQ response to the sending device, so that the sending device retransmits a data packet that is incorrectly transmitted. For example, when an acknowledgement (acknowledgement, ACK) is not included in the HARQ response corresponding to the data packet sent in the reference time unit or a relatively large proportion-of negative acknowledgements (negative acknowledgement, NACK) exist in the HARQ response corresponding to the data packet sent in the reference time unit, a sending device increases the CWS. In next LBT, the sending node performs channel sensing by using an increased CWS, to avoid collision with a surrounding contention node at the cost of an extended sensing time and implement friendly coexistence. When an ACK is included in the HARQ response corresponding to the data packet sent in the reference time unit or a relatively small proportion of NACK exist in the HARQ response corresponding to the data packet sent in the reference time unit, the sending device decreases the CWS, to reduce a sensing time and improve channel access efficiency. For another example, when the sending device receives one or more ACKs for the reference time unit, the sending node decreases the CWS; when the sending device does not receive one or more ACKs for the reference time unit, the sending node increases the CWS.

Figure 2:
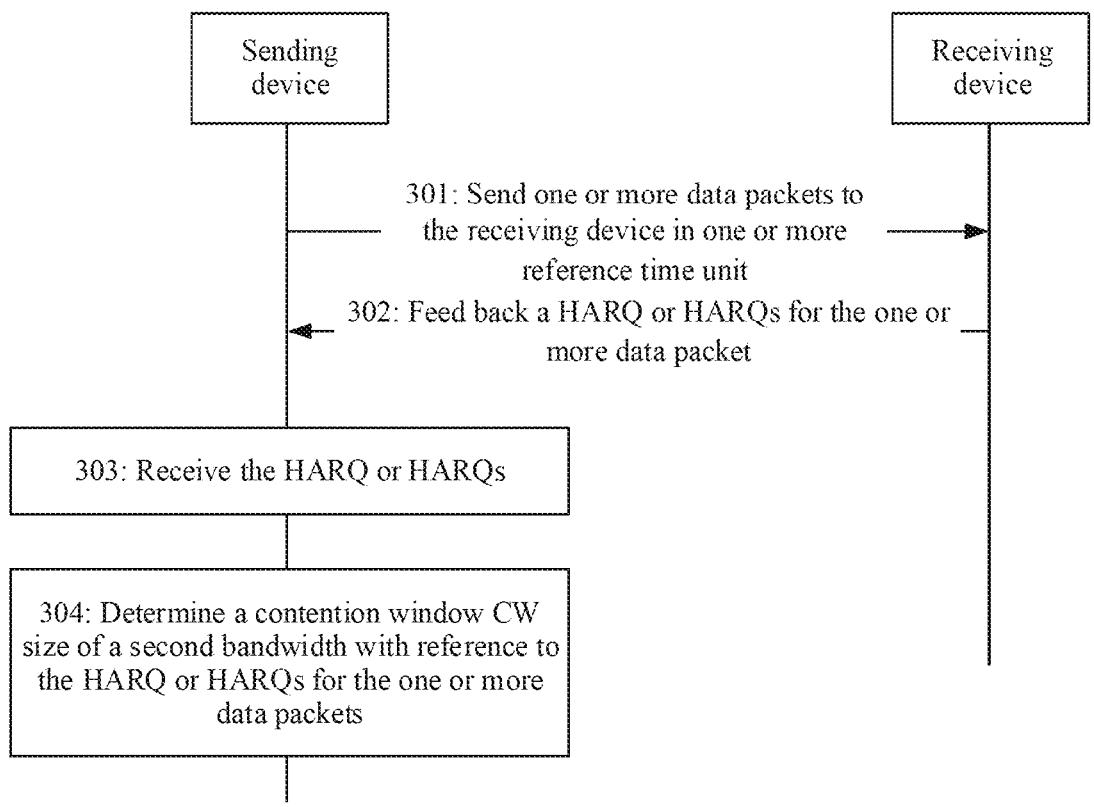
FIG. 2 is a flowchart of a method according to an embodiment of this application.

It can be learned from the foregoing content that, the CWS affects duration for which the sending device performs sensing. A granularity of a resource transmission unit in an NR system may be smaller. To more accurately update a contention window CW, achieve flexible scheduling, and improve communication efficiency, an embodiment of this application provides a CW management method. Referring to FIG. 2, for ease of description, only one receiving device is shown in the figure. It may be understood that, the method in this application may be applicable to a plurality of receiving devices. The method includes the following steps.

301: A sending device sends one or more data packets to one or more receiving devices in one reference time unit or a plurality of reference time units, where the one or more data packets occupy a first bandwidth.

The "first bandwidth" refers to a frequency domain range, and may include one or more frequency domain units. The frequency domain unit in this embodiment and the following embodiments may correspond to a carrier (referred to as a component carrier (CC)), a subband (SBD), or a bandwidth part (BWP). Different frequency domain units may correspond to a same device or different devices.

The foregoing data packet may be a data packet that is received based on a CBG and/or for which HARQ feedback is performed based on a CBG (the data packet is referred to as a "CBG-based data packet" hereinafter), or may be a data packet that is received based on a TB and/or for which HARQ feedback is performed based on a TB (the data packet is referred to as a "TB-based data packet" hereinafter). Each of the one or more data packets may be a CBG-based data packet, or may be a TB-based data packet, or the one or more data packets may include both a TB-based data packet and a CBG-based data packet.

The foregoing reference time unit may be a frame (frame), a transmission time interval (transmission time interval, TTI), a subframe (subframe), a mini-slot (mini-slot), a non-slot (non-slot), or a slot (slot). In some embodiments of this application, the reference time unit is a start time unit of a latest transmission performed by the sending device, and the sending device receives a HARQ-ACK feedback corresponding to the reference time unit. A more detailed description is provided below.

Figure 3:
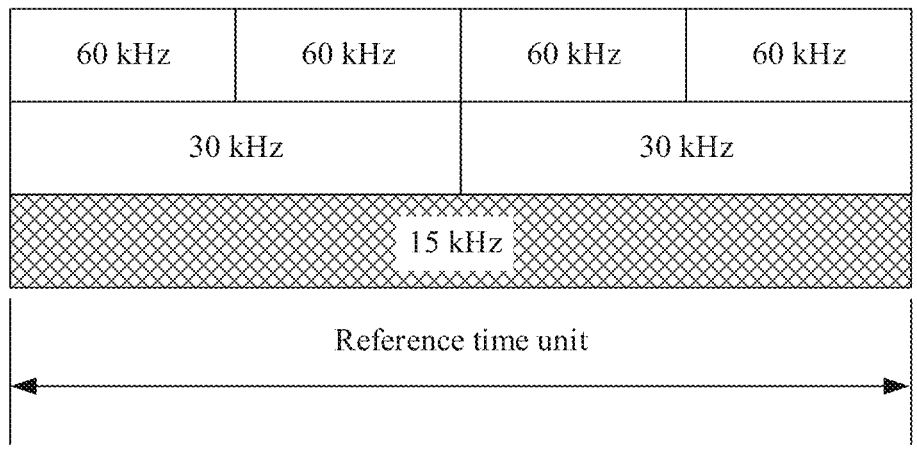
FIG. 3 to FIG. 6 are schematic diagrams of a plurality of types of reference time units according to different embodiments of this application.
Figure 4:
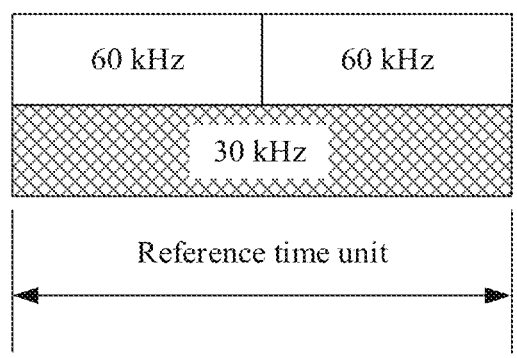

In an embodiment, for example, in a scenario in which transmission using a plurality of types of numerologies (numerology) is supported, the reference time unit may be a time unit corresponding to a smallest subcarrier spacing. For example, when subcarrier spacings of 15 kHz, 30 kHz, and 60 kHz coexist, the reference time unit is a time unit corresponding to the subcarrier spacing of 15 kHz (referring to FIG. 3). When subcarrier spacings of 30 kHz and 60 kHz coexist, the reference time unit is a time unit corresponding to the subcarrier spacing of 30 kHz (referring to FIG. 4).

Figure 5:
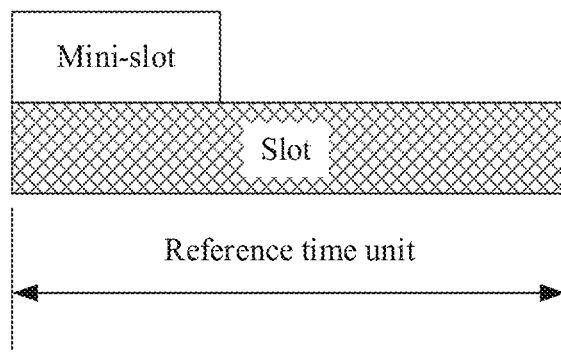
Figure 6:
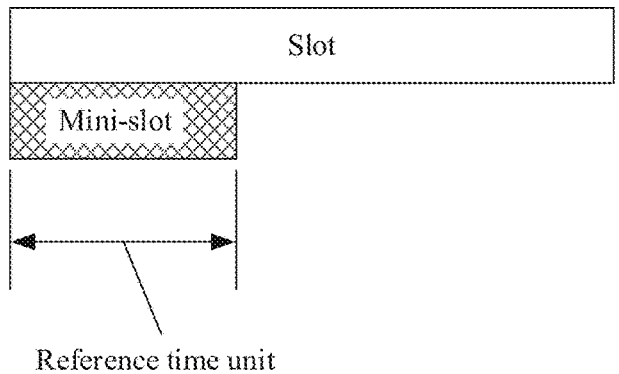

In another embodiment, for example, in a scenario in which a slot structure based on a slot and a non-slot/minislot (mini-slot) is supported, the reference time unit may be a longest time unit in the slot structure (referring to FIG. 5) or a shortest time unit in the slot structure (referring to FIG. 6).

It should be noted that, the reference time unit is a time unit of a latest transmission performed by the sending device, where the latest transmission is a transmission in which the sending device sends a data packet after successfully accessing a device. In this case, in an application scenario of an unlicensed band, in a time unit, the sending device may fail to contend for a channel and cannot transmit a data packet. Therefore, there is a specific time interval between the latest transmission and sensing that is to be performed by the sending device. For example, the reference time unit may be the first time unit of the latest transmission performed by the sending device, or may be the last time unit of the latest transmission performed by the sending device.

Figure 7:
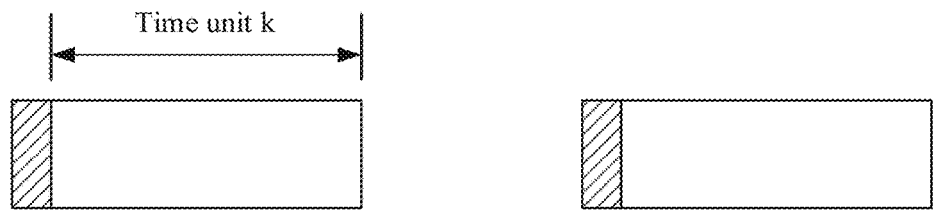
FIG. 7 is a schematic diagram of determining a reference time unit according to an embodiment of this application.
Figure 8:
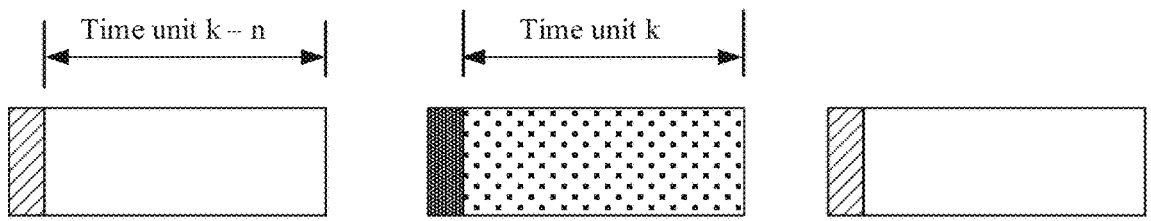
FIG. 8 is a schematic diagram of determining a reference time unit according to another embodiment of this application.

For example, referring to FIG. 7, because the sending device successfully accesses a channel, the sending device starts to send a data packet in a time unit k. In this case, transmission in the time unit k is a latest transmission, and the time unit k is a reference time unit. For another example, referring to FIG. 8, the sending device does not send a data packet in a time unit k because the sending device fails to access a channel, but the sending device sends a data packet in a time unit k-n because the sending device successfully accesses a channel. It can be learned that, transmission in the time unit k-n is a latest transmission. In this case, the time unit k cannot be used as a reference time unit, but the time unit k-n is used as a reference time unit, where n represents a quantity of time units included in one transmission.

Figure 9:
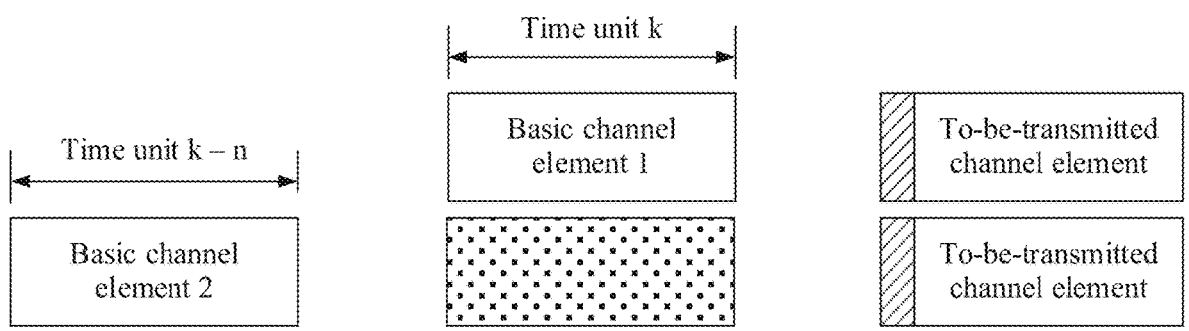
FIG. 9 is a schematic diagram of determining a reference time unit according to still another embodiment of this application.

The following describes a scenario in which a plurality of reference time units are involved. Referring to FIG. 9, for example, the first bandwidth includes a frequency domain unit 1 and a frequency domain unit 2. The sending device sends a data packet on the frequency domain unit 1 in a time unit k. Therefore, the time unit k is a reference time unit of the sending device. Because the sending device fails to contend for a channel on the frequency domain unit 2, the sending device sends a data packet on the frequency domain unit 2 in a time unit k-n. The sending device performs a latest transmission in the time unit k-n. In this case, the sending device sends the one or more data packets to the one or more receiving devices in the time units k and k-n, where the one or more data packets occupy the first bandwidth that includes the frequency domain unit 1 and the frequency domain unit 2.

302: The one or more receiving devices receive the one or more data packets from the sending device, and feed back a HARQ or HARQs for the one or more data packets.

The receiving device receives the data packet, and checks the received data packet. When the data packet is a CBG-based data packet, the receiving device feeds back a NACK or an ACK based on one CBG. When the data packet is a TB-based data packet, the receiving device feeds back a NACK or an ACK based on one TB. The one or more receiving devices receive the one or more data packets sent by the sending device in the one reference time unit or the plurality of reference time units, and feed back a HARQ or HARQs for the one or more data packets. Channel quality in the one reference time unit or the plurality of reference time units may be reflected by the HARQ or HARQs fed back for the one or more data packets.

303: The sending device receives, from the one or more receiving devices, a hybrid automatic repeat request HARQ or HARQs for the one or more data packets.

Optionally, the HARQ or HARQs received by the sending device from the receiving device is or are a HARQ or HARQs fed back based on a TB or TBs for the one or more data packets sent in the one reference time unit or the plurality of reference time units. Alternatively, the HARQ or HARQs is or are a HARQ or HARQs fed back based on a CBG or CBGs for the one or more data packets sent in the one reference time unit or the plurality of reference time units. Alternatively, the HARQ or HARQs may include both a HARQ fed back based on a TB and a HARQ fed back based on a CBG. In other words, the hybrid automatic repeat request HARQ or HARQs for the one or more data packets includes or include one or a combination of the following: a transport block HARQ (TB HARQ) or TB HARQs corresponding to one or more first data packets, or one or more code block group HARQs (CBG HARQ) corresponding to one or more second data packets.

304: The sending device determines a contention window CW size of a second bandwidth with reference to the HARQ or HARQs for the one or more data packets.

The sending device determines the contention window size of the second bandwidth, and performs channel sensing on the second bandwidth based on the determined contention window size. The sending device needs to perform subsequent transmission on the second bandwidth. Channel quality in a previous transmission is reflected by HARQ information. In different embodiments, a frequency domain range occupied by the first bandwidth of the sending device may be the same as or different from a frequency domain range occupied by the second bandwidth. When the channel quality is poor, a contention window needs to be extended, and therefore, the sending device can have a longer time to perform backoff. In this step, the contention window size of the second bandwidth is determined with reference to the one or more CBG HARQs. The sending device may perform channel sensing on the second bandwidth based on the determined contention window size.

In an embodiment, for a contention window CW value, refer to the following Table 1.

TABLE 1

| Channel access priority class (Channel Access Priority Class) | | | | |
|---|---|---|---|---|
| Channel access priority class (p) | $m_p$ | $CW_{min,p}$ $CW_{max,p}$ | $T_{mcot,p}$ | Allowed $CW_p$ sizes |
| 1 | 1 | 3   7 | 2 ms | {3, 7} |
| 2 | 1 | 7   15 | 3 ms | {7, 15} |
| 3 | 3 | 15   63 | 8 ms or 10 ms | {15, 31, 63} |
| 4 | 7 | 15   1023 | 8 ms or 10 ms | {15, 31, 63, 127, 255, 511, 1023} |

Channel access priority class (p) indicates different channel access priority classes. $m_p$ is used to determine $T_d$ of a procedure and corresponds to different priority classes, where $T_d = T_f + m_p \times T_{sl}$, $T_f = 16$ us, and $T_{sl} = 9$ us. $CW_{min, p}$ represents a minimum CW value corresponding to a priority class. $CW_{max, p}$ represents a maximum CW value corresponding to the priority class. $T_{mcot, p}$ represents a maximum channel occupancy time. Allowed $CW_p$ sizes indicates allowed CW values corresponding to the priority class. For example, a priority class p=1. A minimum CW value corresponding to p is 3, a maximum CW value corresponding to p is 7, and allowed CW values corresponding to p are {3,7}.

For different channel access priority classes p, $CW_p$ is used to represent corresponding CWs. The sending device adjusts CWp by performing the following steps:

1) For each access priority class p ∈{1,2,3,4}, set $CW_p = CW_{min,p}$, in other words, select a minimum CW value corresponding to the priority class.

2) Determine the contention window CW size of the second bandwidth with reference to the HARQ or HARQs for the one or more data packets, for example, increase $CW_p$ and then maintain increased $CW_p$, so that the sending device performs channel sensing on the second bandwidth based on updated $CW_p$; or re-initialize $CW_p$ to a minimum contention window or decrease the contention window of the second bandwidth.

In the following, when the contention window CW of the second bandwidth is determined based on the HARQ or HARQs, a HARQ response at least includes one or more of the following states: acknowledgement (ACK), negative acknowledgement (NACK), and discontinuous transmission (DTX). When the contention window CW size of the second bandwidth is determined with reference to the HARQ or HARQs for the one or more data packets, optionally, DTX may be equivalent to the NACK, or DTX may be ignored. For a specific manner, refer to a description in 36.213. This is not limited in this application. In an embodiment, determining the contention window CW size of the second bandwidth with reference to the HARQ or HARQs for the one or more data packets includes:

determining a proportion Z of NACKs or ACKs in the HARQ or HARQs for the one or more data packets, for example, determining a proportion Z of NACKs in the HARQ or HARQs for the one or more data packets in the the one reference time unit or the plurality of reference time units, or a proportion Z of ACKs in the HARQ or HARQs for the one or more data packets sent in the one reference time unit or the plurality of reference time units, or a proportion Z of NACKs to ACKs in the HARQ or HARQs for the one or more data packets sent in the one reference time unit or the plurality of reference time units; and determining the contention window CW of the second bandwidth based on the proportion Z.

"With reference to the HARQ or HARQs for the one or more data packets" means that the HARQ or HARQs for the one or more data packets is or are used as an input for determining the contention window CW of the second bandwidth. For example, when the HARQ or HARQs includes or include only a HARQ or HARQs fed back based on a CBG or CBGs, the sending device may determine the contention window size of the second bandwidth based on a proportion of NACKs or ACKs that are fed back based on CBGs and that are in all the HARQ or HARQs for the one or more data packets. Alternatively, when the HARQ or HARQs includes or include both a HARQ fed back based on a CBG and a HARQ fed back based on a TB, the sending device may first convert a proportion of NACKs or ACKs in the HARQ fed back based on the CBG into a proportion of NACKs or ACKs fed back based on TBs, and then determine the contention window size of the second bandwidth by combining the proportion of NACKs or ACKs fed back based on the TBs with a proportion of other NACKs or ACKs that are fed back based on TBs and that are for the one or more data packets. Alternatively, when the HARQ or HARQs includes or include only a HARQ or HARQs fed back based on a TB or TBs, the sending device may determine the contention window size of the second bandwidth based on a proportion of NACKs or ACKs that are fed back based on TBs and that are in all the HARQ or HARQs for the one or more data packets.

The determining the contention window CW of the second bandwidth based on the proportion Z includes: when the proportion Z of NACKs is greater than or equal to a first preset value, increasing a contention window of the second bandwidth; when the proportion Z of NACKs is less than a first preset value, re-initializing the contention window to a minimum contention window or decreasing the contention window of the second bandwidth. In some implementations, the first preset value may be a specific value, or the first preset value may be a value dynamically selected from a preset range. The preset value may be selected with reference to channel quality. The reason is as follows: When the channel quality is relatively poor, increasing a contention window value enables the sending device to perform backoff in a longer time. This avoids interference caused by collision. When the channel quality is relatively good, decreasing a contention window value enables the sending device to complete backoff in a short time. This reduces a channel access time.

For example, when the sending device determines the proportion Z with reference to a quantity of CBGs for which NACKs are fed back and that are in one or more CBGs, the first preset value is 80%. In this case, when the proportion Z is greater than or equal to 80%, the contention window of the second bandwidth is extended; when the proportion Z is less than 80%, the contention window of the second bandwidth is re-initialized to a minimum contention window, or the contention window of the second bandwidth is decreased.

For another example, when the sending device determines the proportion Z with reference to a quantity of CBGs for which ACKs are fed back and that are in one or more CBGs, the first preset value is 20%. In this case, when the proportion Z is less than or equal to 20%, the contention window of the second bandwidth is extended; when the proportion Z is greater than 20%, the contention window of the second bandwidth is re-initialized to a minimum contention window, or the contention window of the second bandwidth is decreased.

For example, in a manner of calculating the proportion Z, the data packets transmitted in the one reference time unit or the plurality of reference time units include both a data packet whose smallest feedback unit is a TB and a data packet whose smallest feedback unit is a CBG. Therefore, the HARQs received by the sending device include both the HARQ fed back based on the TB and the HARQ fed back based on the CBG. The proportion Z satisfies the following formula:

$$Z = \frac{NACK_{TB} + \sum_x Z'}{N_{TB}} \quad \text{formula (1)}$$

$$Z' = \frac{NACK_{CBG}}{N_{CBG}}.$$

Z' represents a proportion of CBGs for which NACKs are fed back and that are in one TB. $N_{CBG}$ represents a quantity of CBGs in the TB. $NACK_{CBG}$ represents a quantity of CBGs for which NACKs are fed back and that are in the TB. $NACK_{TB}$ represents a quantity of TBs for which NACKs are fed back and whose smallest feedback units are TBs and that are transmitted in the one reference time unit or the plurality of reference time units. $N_{TB}$ represents a total quantity of TBs transmitted in the one reference time unit or the plurality of reference time units. x represents a total quantity of TBs whose smallest feedback units are CBGs and that are transmitted in the one reference time unit or the plurality of reference time units.

In another manner of calculating the proportion Z, smallest feedback units of the data packets transmitted in the one reference time unit or the plurality of reference time units each are a TB, or an ACK is fed back for a data packet whose smallest feedback unit is a CBG, or whether a HARQ for a corresponding TB is an ACK or a NACK may be determined according to a rule. The proportion Z satisfies the following formula:

$$Z = \frac{NACK_{TB}}{N_{TB}} \quad \text{formula (2)}$$

$NACK_{TB}$ represents a total quantity of TBs for which NACKs are fed back and that are transmitted in the one reference time unit or the plurality of reference time units. $N_{TB}$ represents a total quantity of TBs transmitted in the one reference time unit or the plurality of reference time units. For example, the rule for determining whether the HARQ for the corresponding TB is the ACK or the NACK may be: when a proportion of NACKs in a feedback for a CBG in the TB exceeds a specific threshold, it is considered that the HARQ for the TB is the NACK.

In still another manner of calculating the proportion Z, smallest feedback units of the data packets transmitted in the one reference time unit or the plurality of reference time units each are a CBG, or an ACK is fed back for a data packet whose smallest feedback unit is a TB. The proportion Z satisfies the following formula:

$$Z = \frac{NACK_{CBG}}{N_{CBG}} \quad \text{formula (3)}$$

$NACK_{CBG}$ represents a total quantity of CBGs for which NACKs are fed back and that are transmitted in the one reference time unit or the plurality of reference time units. $N_{TB}$ represents a total quantity of CBGs transmitted in the one reference time unit or the plurality of reference time units.

In yet another manner of calculating the proportion Z, the data packets transmitted in the one reference time unit or the plurality of reference time units include both a data packet whose smallest feedback unit is a TB and a data packet whose smallest feedback unit is a CBG. For the data packet whose smallest feedback unit is the CBG, there is a HARQ fed back based on the CBG, namely, a HARQ fed back based on a TB, and there is also a HARQ feedback sent based on the TB, namely, a HARQ feedback sent based on the TB. Therefore, the HARQs received by the sending device include both the HARQ fed back based on the TB and the HARQ fed back based on the CBG. The proportion Z satisfies the following formula:

$$Z = \frac{NACK_{TB} + \sum_x Z'}{N_{TB}} \quad \text{formula (4)}$$

$NACK_{TB}$ represents a quantity of TBs whose smallest feedback units are TBs and that are transmitted in the one reference time unit or the plurality of reference time units and for which NACKs are fed back, namely, a quantity of TBs for which HARQ feedback is performed based on a TB and for which NACKs are fed back. $N_{TB}$ represents a total quantity of TBs transmitted in the one reference time unit or the plurality of reference time units. x represents a quantity of TBs that are in the one reference time unit or a plurality of reference time units and for which HARQ feedback is performed based on a CBG, where the quantity of TBs may be understood as a quantity of TBs whose smallest feedback units are CBGs. Alternatively, in some other implementations, x may represent a quantity of TBs transmitted based on CBGs. In some implementations, $$Z' = \frac{\alpha \cdot NACK_{CBG} + \beta \cdot N_{NACK}}{\alpha \cdot N_{CBG} + \beta}.$$

$Z'$ represents a proportion of NACKs for one TB. $N_{CBG}$ represents a quantity of CBGs in the TB. $NACK_{CBG}$ represents a quantity of CBGs for which NACKs are fed back and that are in the TB. In this implementation, for the TB, a HARQ feedback is sent based on a CBG, and a HARQ feedback is also sent based on a TB. $N_{NACK}$ is used to represent a TB-based HARQ feedback for the TB. If the TB-based HARQ feedback for the TB is a NACK, $N_{NACK}=1$. If the TB-based HARQ feedback for the TB is an ACK, $N_{NACK}=0$. In another implementation, if for the TB, a HARQ feedback is sent only based on a CBG but not based on a TB, $N_{NACK}=0$. Optionally, α and β represent weighting factors of a CBG-based HARQ feedback and a TB-based HARQ feedback respectively. Optionally, α+β=1. For example, values of α and β may be 0 and 1 respectively, or may be both 0.5, or may be other values. This is not limited in this application.

For example, for a TB (represented by "TB 1" below), there are both CBG-based HARQ feedbacks and a TB-based HARQ feedback. The TB 1 includes four CBGs. If ACKs are fed back for all the four CBGs, in other words, a CBG for which a NACK is fed back does not exist in the TB 1, according to the foregoing rule, $NACK_{CBG}=0$. If the TB-based HARQ feedback in the TB 1 is a NACK, according to the foregoing rule, $N_{NACK}=1$. For example, corresponding values of α and β are both 0.5. In this case, a proportion $Z'$ of NACKs for the TB 1 is 0.2.

In some other implementations, $$Z' = \frac{\alpha \cdot NACK_{CBG}}{\alpha \cdot N_{CBG}} + \beta \cdot N_{NACK}.$$

$Z'$ represents a proportion of NACKs for one TB. $N_{CBG}$ represents a quantity of CBGs in the TB. $NACK_{CBG}$ represents a quantity of CBGs for which NACKs are fed back and that are in the TB. In this implementation, for the TB, a HARQ feedback is sent based on a CBG, and a HARQ feedback is also sent based on the TB. $N_{NACK}$ is used to represent a TB-based HARQ feedback for the TB. If the TB-based HARQ feedback for the TB is a NACK, $N_{NACK}=1$. the TB-based HARQ feedback for the TB is an ACK, $N_{NACK}=0$. In another implementation, if for the TB, a HARQ feedback is sent only based on a CBG but not based on the TB, $N_{NACK}=0$. Optionally, α and β represent weighting factors of a CBG-based HARQ feedback and a TB-based HARQ feedback respectively. Optionally, α+β=1. For example, values of α and β may be 0 and 1 respectively, or may be both 0.5, or may be other values. This is not limited in this application.

For example, for a TB (represented by "TB 2" below), there are both CBG-based HARQ feedbacks and a TB-based HARQ feedback. The TB 2 includes four CBGs. If ACKs are sent for all the four CBGs, in other words, a CBG for which a NACK is fed back does not exist in the TB 2, according to the foregoing rule, $NACK_{CBG}=0$. If the TB-based HARQ feedback in the TB 2 is a NACK, according to the foregoing rule, $N_{NACK}=1$. For example, corresponding values of α and β are both 0.5. In this case, a proportion $Z'$ of NACKs for the TB 2 is 0.5.

With reference to any one of the foregoing implementations, for a TB-based data packet, in a possible manner, the receiving device performs HARQ feedback based on a configured maximum quantity of CBGs that is supported. In this case, a CBG that is not actually scheduled and for which a NACK is fed back by the receiving device by default is not included in calculation of Z.

Optionally, for a TB-based data packet, in a possible manner, because of LBT, the sending device does not actually send a scheduled data packet, and the receiving device feeds back a NACK for the data packet based on scheduling signaling according to a default rule. The NACK is not included in calculation of Z.

Figure 14:
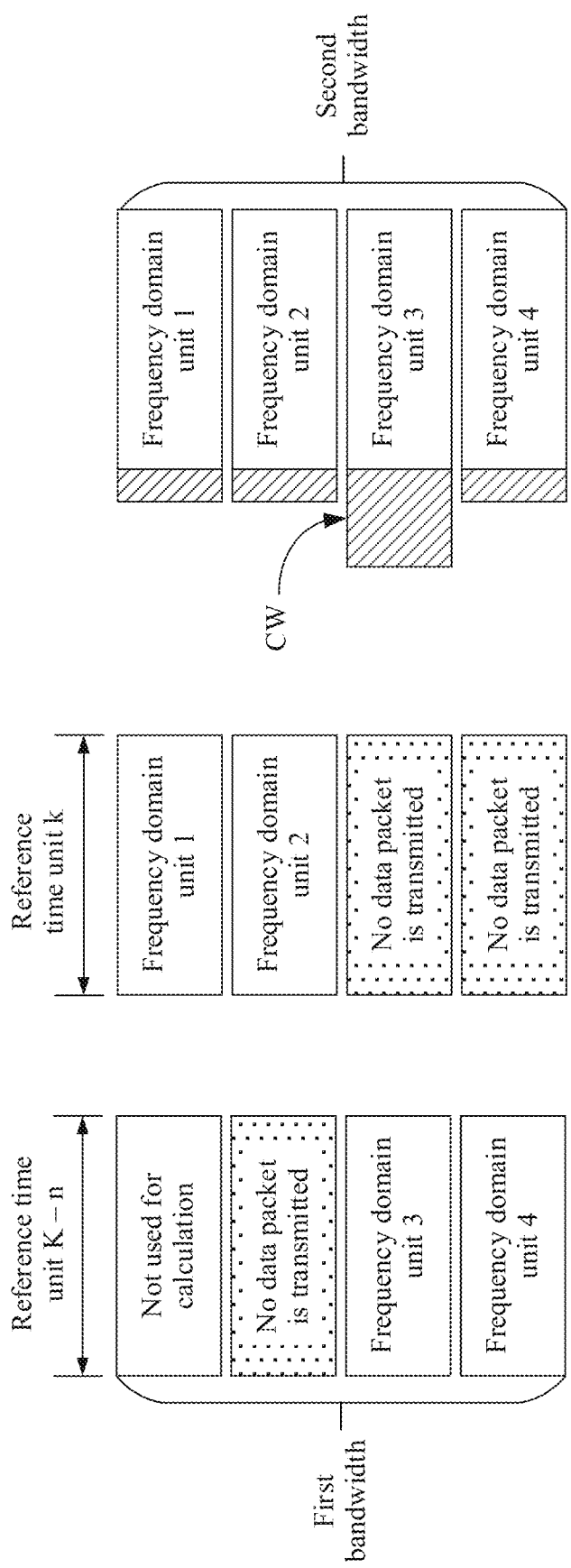
FIG. 14 is a schematic diagram of CW update according to still another embodiment of this application.

It should be noted that, in the foregoing calculation manners, if a frequency domain unit in the first bandwidth are used for transmission in a plurality of reference time units, the frequency domain unit is not repeatedly counted. Referring to FIG. 14, the sending device performs transmission on a frequency domain unit 1 in reference time units k-n and k. In calculation of Z, a HARQ feedback for a data packet transmitted on the frequency domain unit 1 in a latest transmission in the latest reference time unit k before an LBT procedure is counted, but a HARQ feedback for a data packet transmitted on the frequency domain unit 1 in the reference time unit k-n is not counted.

For example, a priority class p=1. An initial $CW_p$ value is 3. The sending device determines the CW of the first bandwidth based on a proportion of NACKs in a HARQ that is for a data packet sent in one reference time unit and that is received by the sending device. When the proportion of NACKs in a feedback that is for the data packet and that is received by the sending device is greater than a preset value, or optionally, there are more NACKs than ACKs, $CW_p$ is increased to 7, and the sending device performs channel sensing on the first bandwidth based on CW=7. Otherwise, $CW_p$ is not updated, and the sending device performs channel sensing on the first bandwidth based on CW=3.

In a flexible-bandwidth scenario, a CWp value of a frequency domain unit may be reused for another frequency domain unit. It is assumed that when LBT is performed, selection of a frequency domain unit may be flexibly changed, and a frequency domain unit in the second bandwidth may inherit a CW value of a frequency domain unit in the first bandwidth. When a frequency domain unit is changed in ascending order, the frequency domain unit in the second bandwidth may reuse a maximum or minimum CW value of each frequency domain unit in the first bandwidth. When a frequency domain unit is changed in descending order, the frequency domain unit in the second bandwidth may reuse the CW value of the frequency domain unit in the first bandwidth.

Figure 10:
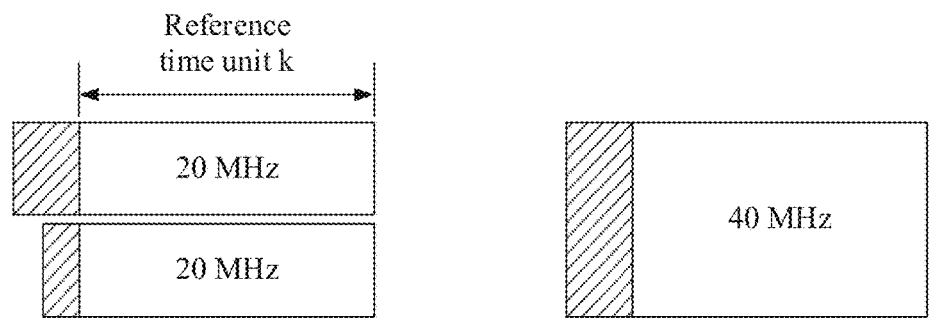
FIG. 10 is a schematic diagram of CW reuse in a flexible-bandwidth scenario according to an embodiment of this application.
Figure 11:
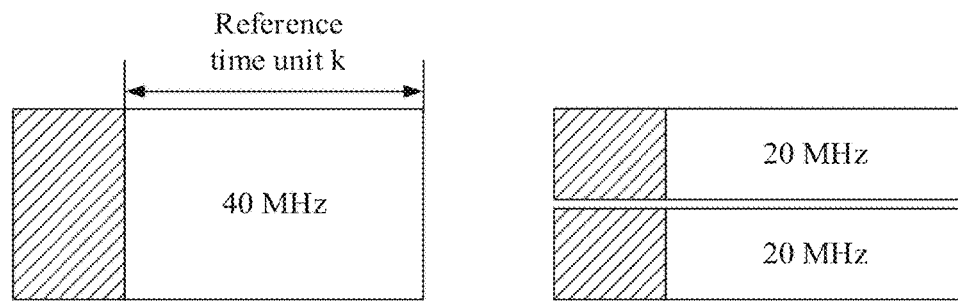
FIG. 11 is a schematic diagram of CW reuse in a flexible-bandwidth scenario according to another embodiment of this application.

Referring to FIG. 10, frequency domain units in the first bandwidth each are of 20 MHz, and a frequency domain unit in the second bandwidth is of 40 MHz. In this case, a frequency domain unit is changed in ascending order, and a $CW_p$ value that is of a 40 MHz basic bandwidth unit in the second bandwidth and that is for the sending device may be the same as a maximum CW value of a 20 MHz basic bandwidth unit in the first bandwidth. Referring to FIG. 11, a frequency domain unit in the first bandwidth is of 40 MHz, and frequency domain units in the second bandwidth each are of 20 MHz. In this case, a frequency domain unit is changed in descending order, and a $CW_p$ value that is of any 20 MHz basic bandwidth unit in the second bandwidth and that is for the sending device may be the same as a CW value of the 40 MHz frequency domain unit in the first bandwidth. Optionally, a reused CW may be further updated, for example, may be extended or shortened, based on a feedback status of a HARQ for a data packet sent in a reference time unit.

In another embodiment, the sending device determines a HARQ for a data packet at least based on one or more CBG HARQs, and determines the contention window CW of the first bandwidth at least based on the determined HARQ for the data packet.

For example, that the sending device determines the HARQ for the data packet at least based on the one or more CBG HARQs means that the sending device determines the HARQ for the data packet with reference to a HARQ or HARQs for one or more CBGs included in the data packet. For example, when one data packet includes one CBG, the sending device may determine, based on that a HARQ that is for the CBG and that is sent by the receiving device is a NACK, that a HARQ for the data packet is a NACK, or the sending device may determine, based on that a HARQ that is for the CBG and that is sent by the receiving device is an ACK, that a HARQ for the data packet is an ACK. When one data packet includes a plurality of CBGs, if a quantity of CBGs for which HARQs sent by the receiving device are ACKs is greater than a quantity of CBGs for which HARQs sent by the receiving device are NACKs, the sending device may determine that a HARQ for the data packet is an ACK; or if a quantity of CBGs for which HARQs sent by the receiving device are NACKs is greater than a quantity of CBGs for which HARQs sent by the receiving device are ACKs, the sending device may determine that a HARQ for the data packet is a NACK.

When it is determined that the HARQ for the data packet is a NACK, the sending device increases a contention window. When it is determined that the HARQ for the data packet is an ACK, the sending device decreases a contention window. The contention window may be increased or decreased in a manner of adjusting a length of the window. For example, when the contention window needs to be increased, the sending device increases a current length of the contention window by 1. When the contention window needs to be decreased, the sending device decreases a current length of the contention window by 1. It may be understood that, the sending device may adjust the length of the contention window by 1 at a time or by another time length at a time. This is not limited in this application.

In an embodiment, step 304 of determining the contention window CW size of the second bandwidth with reference to the HARQ or HARQs for the one or more data packets includes:

determining the contention window CW size of the second bandwidth with reference to the HARQ or HARQs for the one or more data packets sent in the one reference time unit, where the one reference time unit is a start time unit of a latest transmission performed by the sending device.

Figure 12:
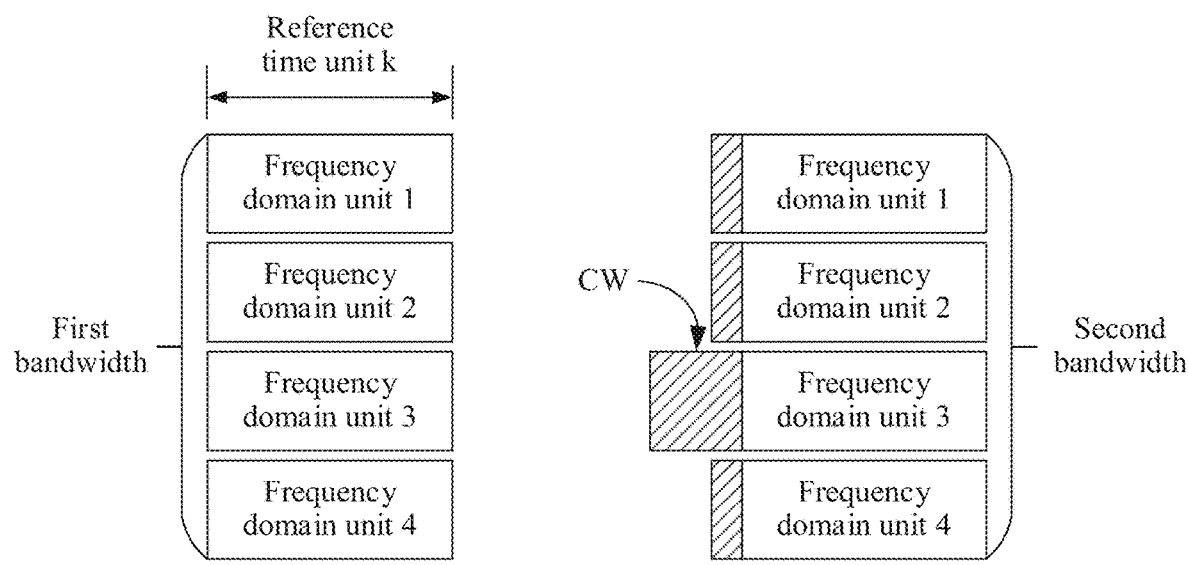
FIG. 12 is a schematic diagram of CW update according to an embodiment of this application.

Referring to FIG. 12, the first bandwidth and the second bandwidth each occupy four frequency domain units 1 to 4. The sending device sends one or more data packets to the receiving device on the frequency domain units 1 to 4 in a reference time unit k, and subsequently receives, from the receiving device, a HARQ or HARQs for the one or more data packets. The sending device may determine the contention window CW size of the second bandwidth with reference to the HARQ or HARQs for the one or more data packets sent on the frequency domain units 1 to 4 in the reference time unit k. As shown in FIG. 12, the sending device randomly selects a frequency domain unit to perform LBT based on a CW. In this way, the sending device performs non-random-backoff-based transmission on the frequency domain units 1, 2, and 4, and performs random-backoff-based transmission on the frequency domain unit 3. In another implementation, a a frequency domain unit in the frequency domain units 1 to 4 except the frequency domain unit 3 may be randomly selected to perform random backoff.

Figure 13:
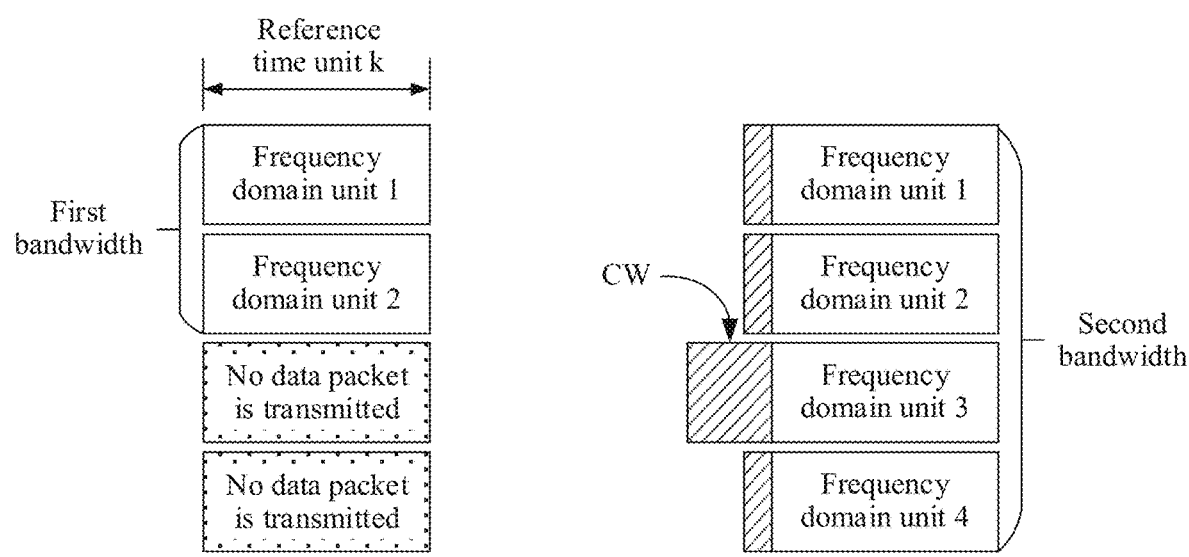
FIG. 13 is a schematic diagram of CW update according to another embodiment of this application.

Referring to FIG. 13, a difference of FIG. 13 from FIG. 12 lies in that, in the reference time unit k, the sending device does not transmit a data packet on the frequency domain units 3 and 4 due to a failure to contend for channels, but transmits one or more data packets on the frequency domain units 1 and 2. In this implementation, the reference time unit is a start time unit of a latest transmission performed by the sending device. Even through there is no data packet transmitted on a frequency domain unit in the start time unit, the sending device still uses the start time unit as the reference time unit, to determine the contention window CW size of the second bandwidth with reference to a HARQ for a data packet sent in the reference time unit. In other words, the sending device receives a HARQ or HARQs for the one or more data packets transmitted on the frequency domain units 1 and 2, to determine the contention window CW size of the second bandwidth.

In some implementations, step 304 of determining the contention window CW size of the second bandwidth with reference to the HARQ or HARQs for the one or more data packets includes: determining the contention window CW size of the second bandwidth with reference to the HARQ or HARQs for the one or more data packets sent in the plurality of reference time units. The HARQ or HARQs for the one or more data packets includes or include the HARQ or HARQs for the one or more data packets sent on non-overlapping frequency domain units in the plurality of reference time units that are the latest for the frequency domain units. To be specific, for a plurality of overlapping frequency domain units, namely, an overlapping area in frequency domain that exists in the plurality of reference time units, a CW window size is determined based on HARQ information for a transmission that is the latest for the frequency domain unit.

Referring to FIG. 14, a difference of FIG. 14 from FIG. 13 lies in that, on the frequency domain units 3 and 4, the sending device does not transmit a data packet in the reference time unit k, but transmits one or more data packets in the reference time unit k-n. According to the method mentioned in FIG. 8, a latest transmission on the frequency domain unit 3 and a latest transmission on the frequency domain unit 4 correspond to the reference time unit k-n. Therefore, HARQs for the frequency domain units 3 and 4 may be determined based on the transmissions in the reference time unit k-n. Because a data packet is transmitted on the frequency domain unit 1 in each of the reference time units k-n and k, the frequency domain unit overlaps in the reference time units k-n and k. In this case, a latest transmission on the frequency domain unit 1 corresponds to the reference time unit k. Therefore, as shown in the figure, a HARQ for the data packet transmitted in the reference time unit k-n on the frequency domain unit 1 (a part that is marked with "not used for calculation" in FIG. 14) is not used to determine the contention window size of the second bandwidth, but a HARQ for the data packet transmitted in the reference time unit k on the frequency domain unit 1 is used to determine the contention window size of the second bandwidth.

Figure 15:
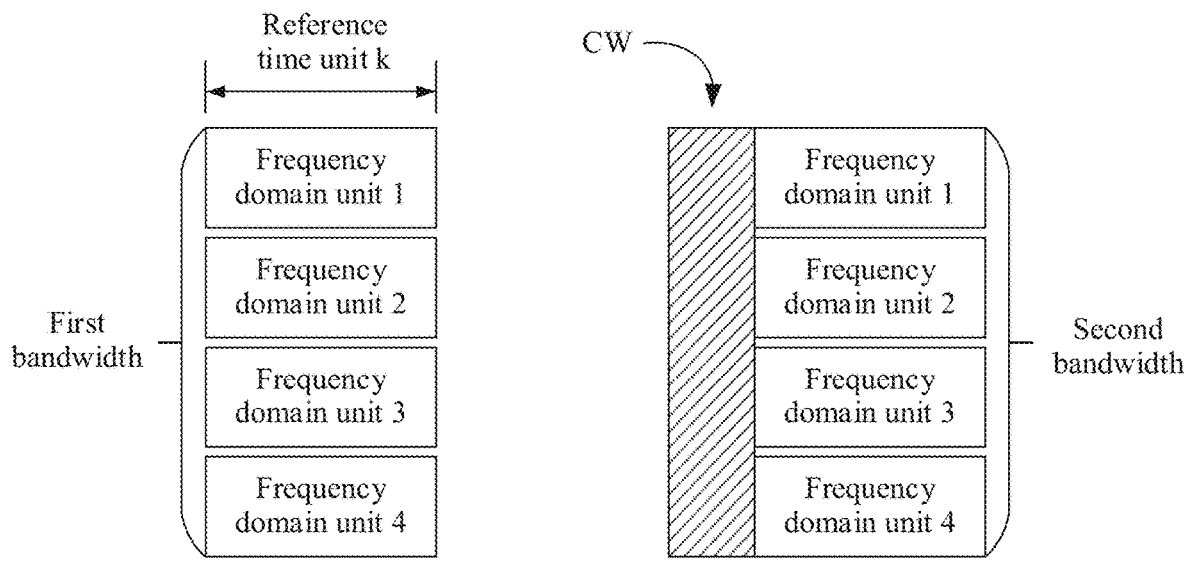
FIG. 15 is a schematic diagram of CW update according to yet another embodiment of this application.
Figure 16:
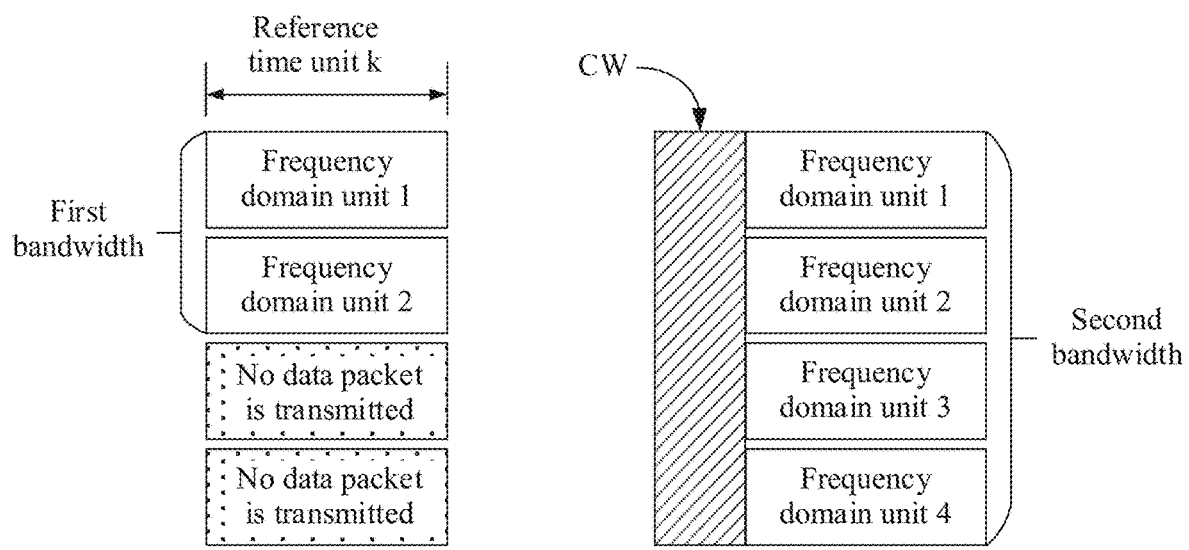
FIG. 16 is a schematic diagram of CW update according to still yet another embodiment of this application.
Figure 17:
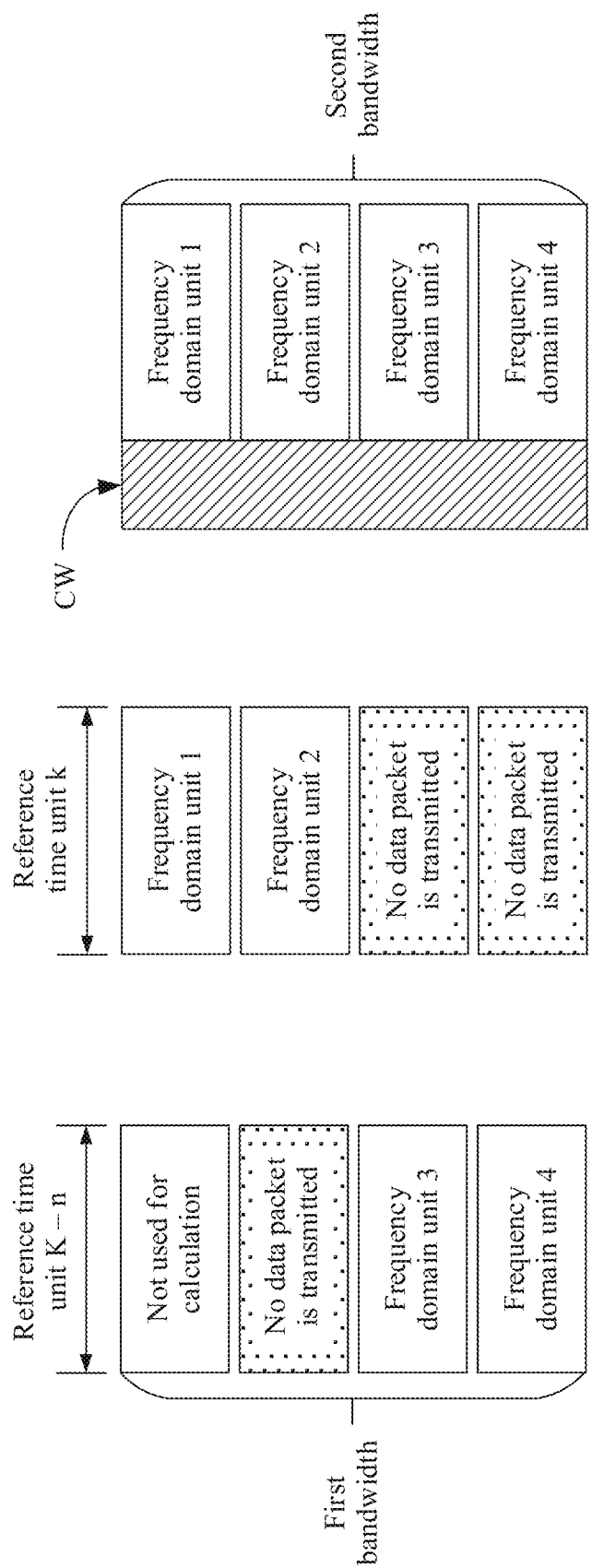
FIG. 17 is a schematic diagram of CW update based on a plurality of reference time units according to an embodiment of this application.

Referring to FIG. 15 to FIG. 17, one CW maintained by the sending device may be further applied to a large bandwidth. Therefore, even though the large bandwidth (namely, the second bandwidth) is divided into a plurality of smaller frequency domain units, the sending device needs to perform LBT only on the large bandwidth, to access channels on the plurality of frequency domain units to perform transmission. It may be understood that, how to obtain the frequency domain unit through division after the sending device successfully performs LBT on the large bandwidth is not specifically limited in this application. Optionally, performing LBT on the large bandwidth is performing CCA detection on the entire second bandwidth.

Figure 18:
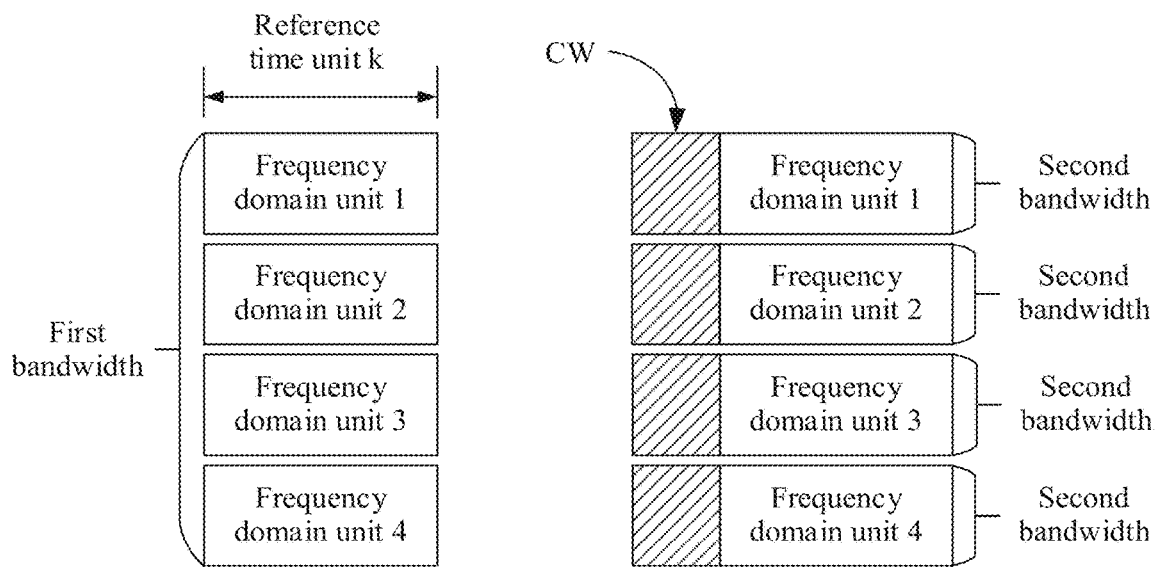
FIG. 18 is a schematic diagram of CW update according to a further embodiment of this application.
Figure 19:
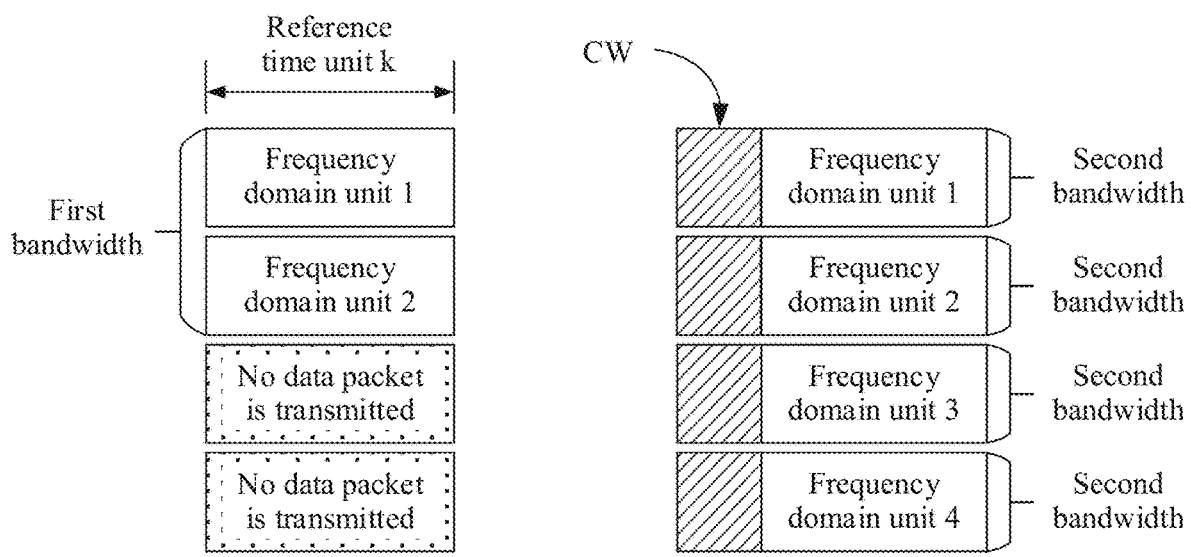
FIG. 19 is a schematic diagram of CW update according to a still further embodiment of this application.
Figure 20:
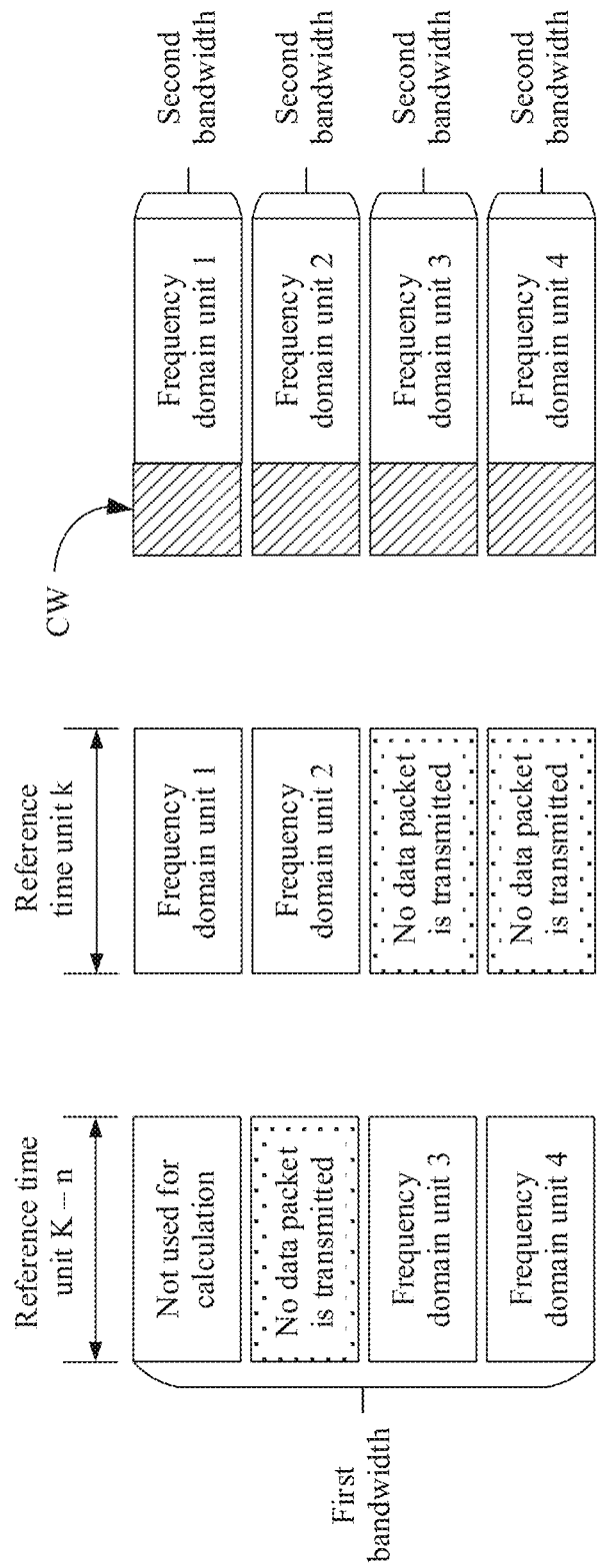
FIG. 20 is a schematic diagram of CW update based on a plurality of reference time units according to an embodiment of this application.

Referring to FIG. 18 to FIG. 20, the foregoing CW applied to the frequency domain unit 3 may be further used for other frequency domain units 1, 2, and 4.

Figure 21:
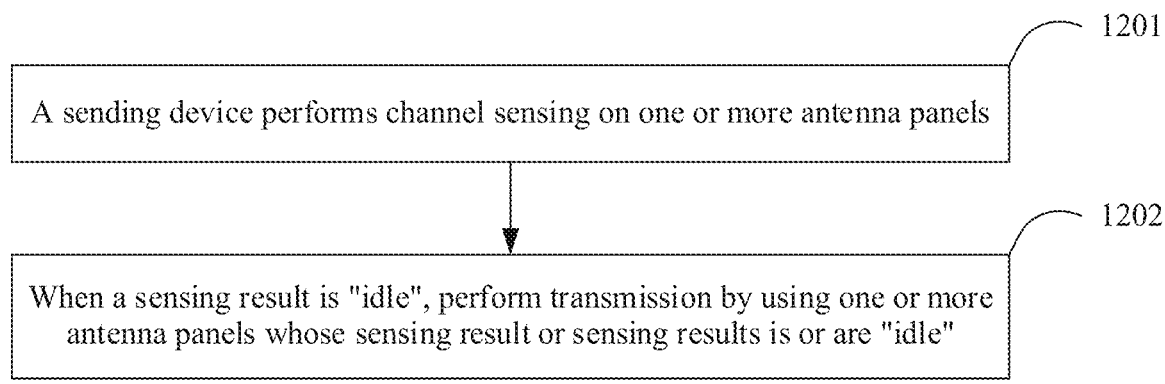
FIG. 21 is a flowchart of a channel sensing method based on a plurality of antenna panels according to an embodiment of this application.

In another embodiment of this application, an LBT sensing method for a sending device is further provided. The sending device includes one or more antenna panels. Referring to FIG. 21, the method includes the following steps:

1201: The sending device performs channel sensing on the one or more antenna panels.

1202: When a sensing result is "idle", perform transmission by using one or more antenna panels whose sensing result or sensing results is or are "idle".

Optionally, that the sending device performs channel sensing on the one or more antenna panels includes: performing, by the sending device, random-backoff-based channel sensing on one antenna panel randomly selected from the one or more antenna panels.

Optionally, only one contention window is maintained for a set including the one or more antenna panels.

Optionally, an independent contention window is maintained for each of the one or more antenna panels.

Optionally, the one or more antenna panels correspond to one or more frequency domain units. When the independent contention window is maintained for each of the one or more antenna panels, reference is made to one common contention window, where only the common contention window is maintained for a set including the one or more frequency domain units corresponding to the one or more antenna panels.

Optionally, the one or more antenna panels correspond to one or more frequency domain units. When the independent contention window is maintained for each of the one or more antenna panels, reference is made to an independent contention window maintained for each of the one or more frequency domain units corresponding to the one or more antenna panels.

Optionally, that the sending device performs channel sensing on the one or more antenna panels includes: performing, by the sending device, channel sensing on each of the one or more antenna panels.

The following describes the foregoing method by using an example with reference to the accompanying drawings.

A network device is used as an example. In a scenario of a plurality of antenna panels, the network device may perform LBT on a plurality of antenna panels. The plurality of antenna panels or a plurality of nodes may correspond to a multi-carrier/multi-subband/multi-BWP scenario. A type A (including type A1 and type A2) LBT mechanism may be applied to a scenario of a plurality of antenna panels or a plurality of nodes.

For example, there are a plurality of antenna panels. When type A LBT is applied to the plurality of antenna panels, Cat 4 LBT is performed independently on each of the antenna panels, and the antenna panel has an independent contention window. When type B LBT is applied to the plurality of antenna panels, Cat 4 LBT is performed on only one of the plurality of antenna panels, and Cat 2 LBT is performed on a remaining antenna panel. For type B1 LBT, only one contention window is maintained for the plurality of antenna panels. For type B2 LBT, each of the antenna panels has an independent contention window.

For the type A LBT and the type B2 LBT, because a contention window is independently maintained for each of the antenna panels, a reference time unit used to determine a contention window size is a start time unit of a latest transmission for which a HARQ feedback is available and that is performed by using each of the antenna panels. The network device determines an update of the contention window size with reference to the foregoing embodiments.

For the type B1 LBT, only one common contention window is maintained for the plurality of antenna panels. In a possible implementation, the plurality of antenna panels may have a same reference time unit. The reference time unit is a start time unit of a latest transmission for which a HARQ feedback is available and that is performed by the network device. A contention window size is determined based on a HARQ for a data packet transmitted in the reference time unit by using each antenna panel. Optionally, because of LBT, transmission may not be performed in the reference time unit by using an antenna panel in the plurality of antenna panels. In this case, the contention window size is determined based on a HARQ for a data packet transmitted in the reference time unit by using an antenna panel in the plurality of antenna panels. Optionally, when transmission is not performed in the reference time unit by using some of the antenna panels, the network device further determines, as a reference time unit of the some of the antenna panels, a start time unit of latest transmissions for which there are HARQ feedbacks and that are performed by using the some of the antenna panels. In this case, the network device determines the contention window size with reference to HARQ feedbacks for data packets transmitted in a plurality of reference time units.

In another possible implementation, the plurality of antenna panels each have a reference time unit. In this case, a reference time unit of each antenna panel is a start time unit of a latest transmission for which there is a HARQ and that is performed by using the antenna panel. A CW size of each antenna panel is determined with reference to a HARQ feedback for a data packet transmitted in the reference time unit of the antenna panel by using the antenna panel. When LBT needs to be performed, a largest or smallest CW value is selected from contention windows of antenna panels on which Cat 4 LBT needs to be performed, to perform LBT on the antenna panels.

Figure 22:
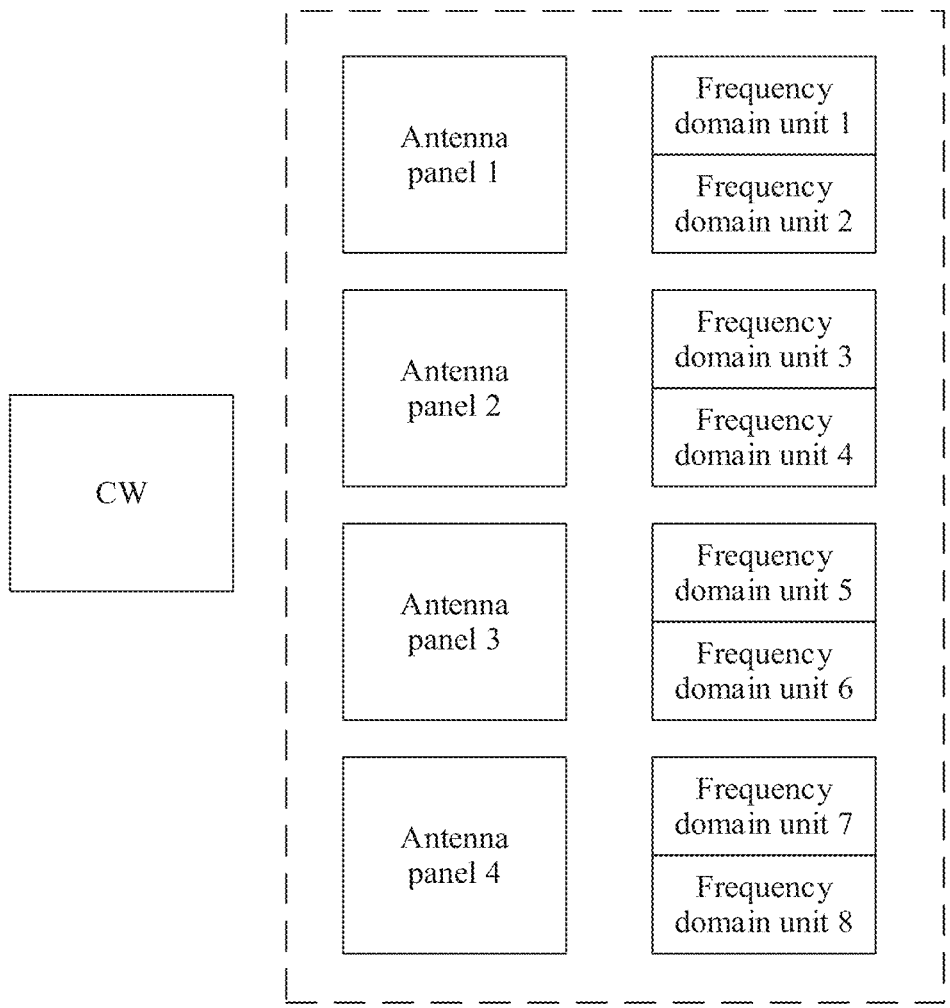
FIG. 22 is a schematic diagram of a correspondence between a CW and a plurality of antenna panels according to an embodiment of this application.

For example, a random backoff number is determined based on a common contention window during LBT. Referring to FIG. 22, an antenna panel 1 of a network device corresponds to frequency domain units 1 and 2, an antenna panel 2 corresponds to frequency domain units 3 and 4, an antenna panel 3 corresponds to frequency domain units 5 and 6, and an antenna panel 4 corresponds to frequency domain units 7 and 8. According to the method shown in FIG. 3, the network device sends one or more data packets to one or more receiving devices in one reference time unit or a plurality of reference time units on the frequency domain units 1 to 8, and determines a contention window size with reference to a HARQ or HARQs for the one or more data packets. If the reference time unit is a start time unit of a latest transmission for which a HARQ feedback is available and that is performed by the network device, there is one reference time unit. If the reference time unit is a start time unit of a latest transmission for which a HARQ feedback is available and that is performed on each of the frequency domain units 1 to 8, because LBT may fail, there are one reference time unit or a plurality of reference time units. When Cat 4 LBT needs to be performed on an antenna panel, an initial value of the random backoff number may be determined based on the common contention window of the network device. In other words, in a possible implementation, the reference time unit is a first reference time unit of a latest transmission for a current LBT procedure. Alternatively, in another possible implementation, the reference time unit is a start time unit of a latest transmission corresponding to each of the frequency domain units 1 to 8.

Figure 23:
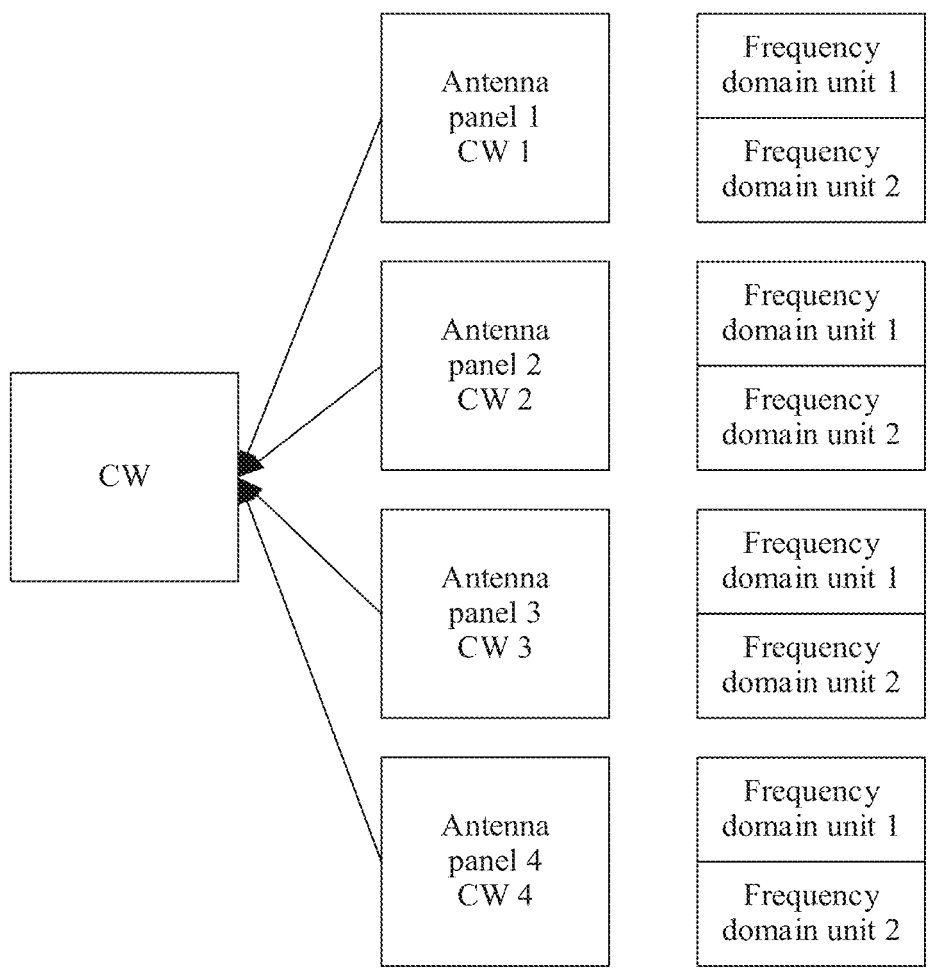
FIG. 23 is a schematic diagram of correspondences between CWs and a plurality of antenna panels according to another embodiment of this application.

For example, a random backoff number is determined based on a common contention window during LBT, and each antenna panel has an independently maintained contention window. Referring to FIG. 23, a CW 1 to a CW 4 each are maintained for an antenna panel. A largest or smallest contention window is selected from the CW 1 to CW 4 as a common contention window, and an initial value of the random backoff number is determined based on the common contention window. The antenna panel CW 1 to CW 4 each may be determined based on contention windows of frequency domain units 1 and 2 corresponding to each antenna panel. An antenna panel 1 is used as an example. The antenna panel CW 1 is maintained for the antenna panel 1. One or more data packets are sent to one or more receiving devices in one or more time units on frequency domain units 1 and 2 by using the antenna panel 1, and the antenna panel CW 1 is determined based on a HARQ feedback or HARQ feedbacks from the one or more receiving devices.

Figure 24:
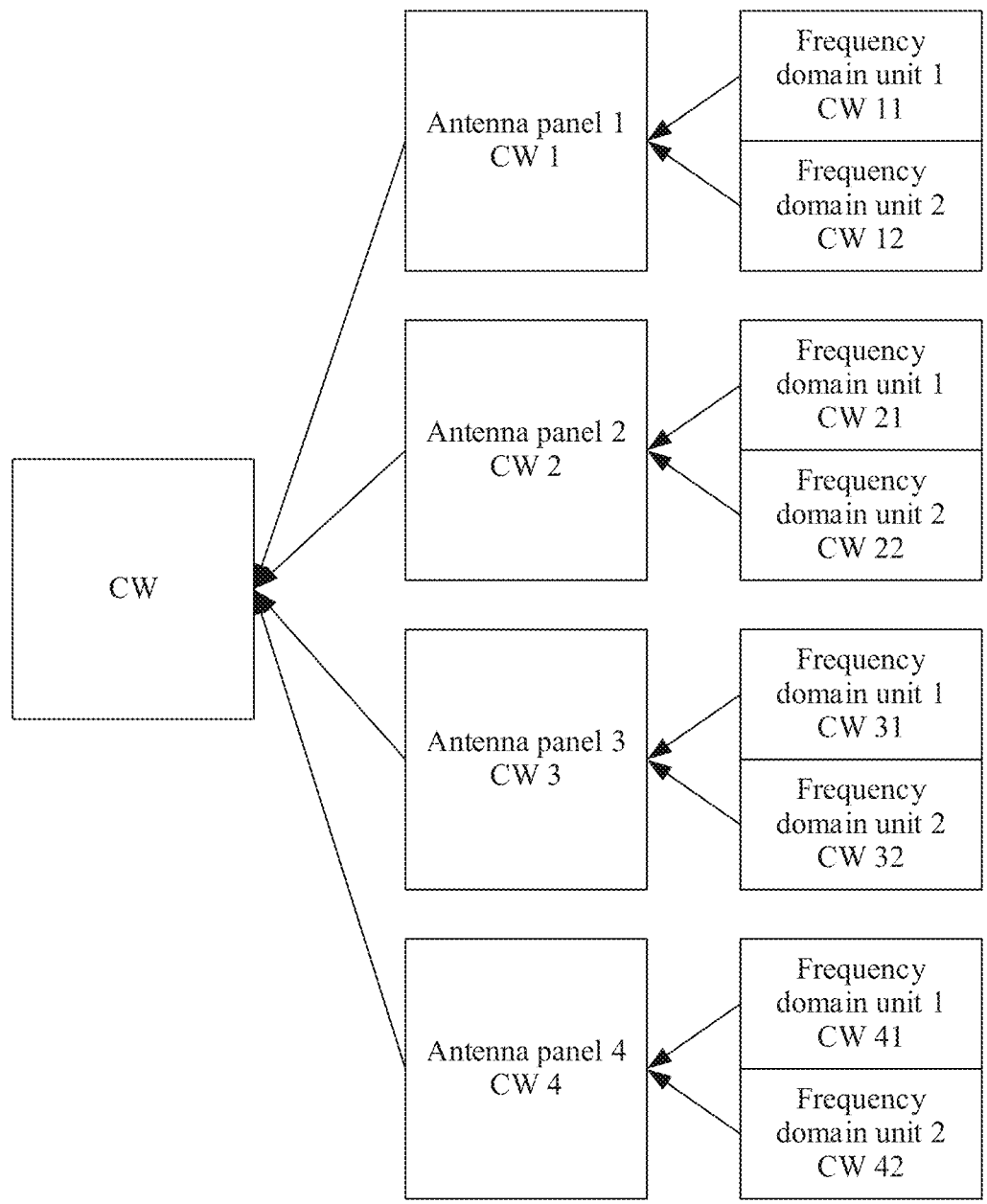
FIG. 24 is a schematic diagram of correspondences between CWs and a plurality of antenna panels according to still another embodiment of this application.

Further, for example, referring to FIG. 24, a random backoff number is determined based on a common contention window during LBT, each antenna panel has an independent contention window, and each frequency domain unit has an independent contention window. In this case, the common contention window of the network device is a largest or smallest contention window CW of antenna panels C1 to C4, and contention windows of the antenna panels CW 1 to CW 4 each correspond to a largest or smallest contention window of a plurality of frequency domain units.

Figure 25:
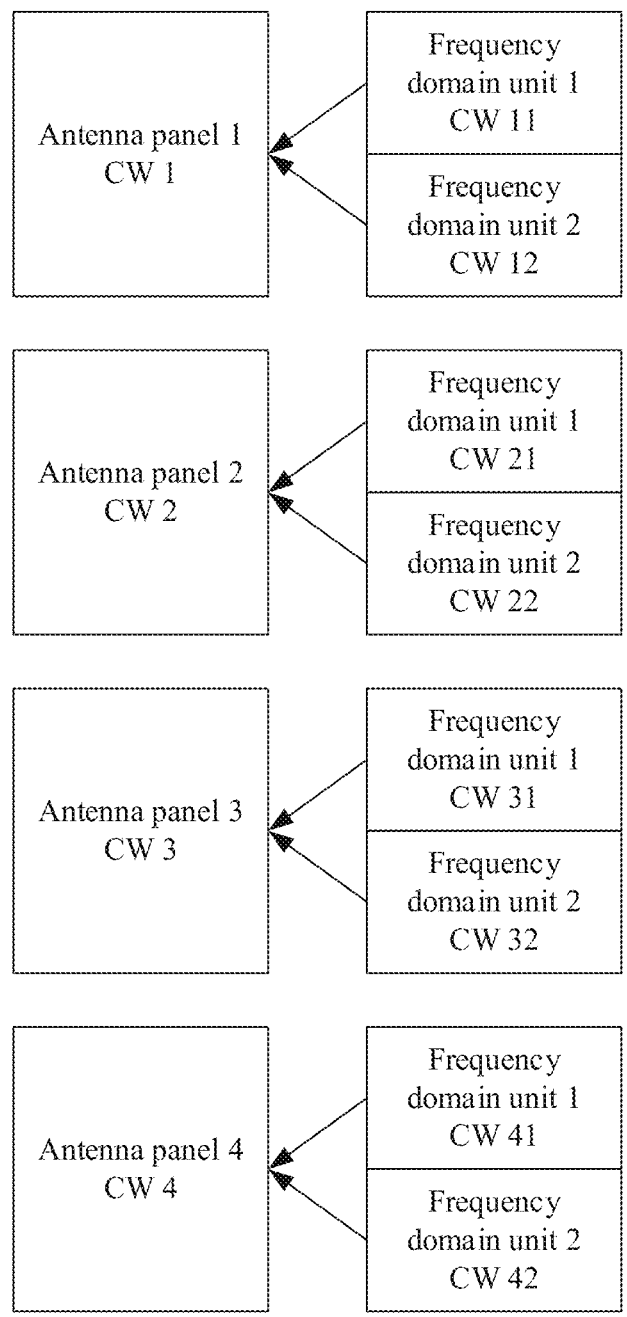
FIG. 25 is a schematic diagram of correspondences between CWs and a plurality of antenna panels according to yet another embodiment of this application.

Referring to FIG. 25, an independent contention window is maintained for each antenna panel, and the contention window of each antenna panel is determined based on a frequency domain unit 1 or 2 corresponding to the antenna panel. Optionally, a largest or smallest contention window in contention windows of frequency domain units 1 and 2 is selected as the contention window CW of the corresponding antenna panel.

Figure 26:
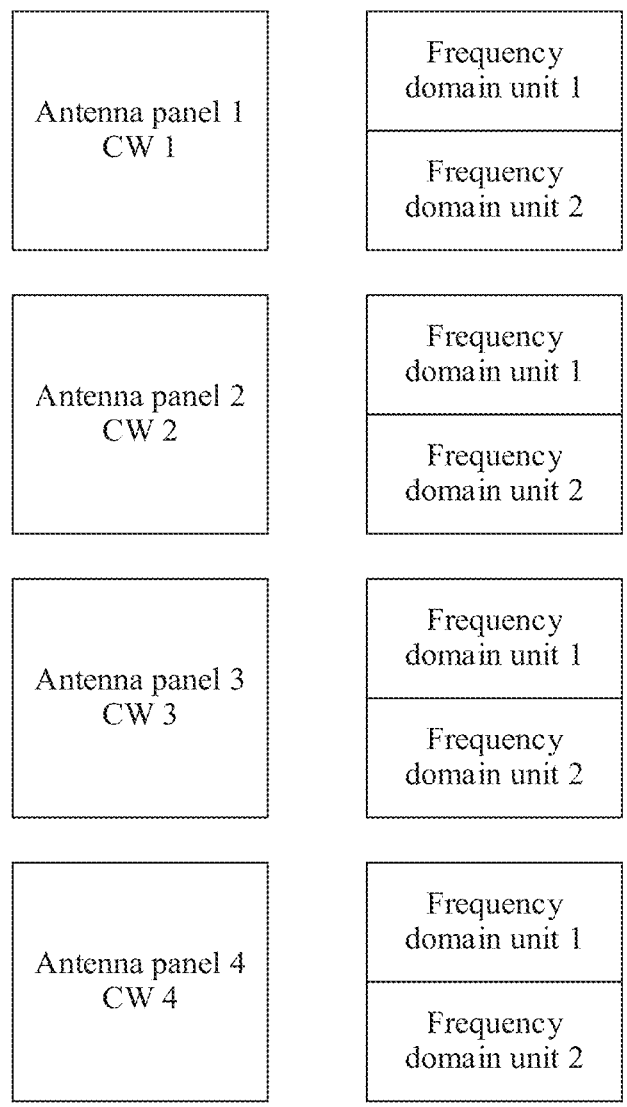
FIG. 26 is a schematic diagram of correspondences between CWs and a plurality of antenna panels according to still yet another embodiment of this application.

Referring to FIG. 26, an independent contention window is maintained for each antenna panel. The contention window of each antenna panel is a common contention window of a plurality of frequency domain units corresponding to the antenna panel.

The foregoing describes a plurality of embodiments of the contention window management method in this application by using examples. The following continues to describe embodiments of a network device and a terminal in this application by using examples. The foregoing sending device may be a network device or a terminal.

The network device is first described by using an example. In a specific example, a structure of the network device includes a processor and a transceiver. In a possible example, the structure of the network device may further include a communications unit. The communications unit is configured to support the network device in communicating with another network-side device such as a core network node. In another possible example, the structure of the network device may further include a memory. The memory is coupled to the processor and is configured to store a program instruction and data that are necessary for the network device.

Figure 27:
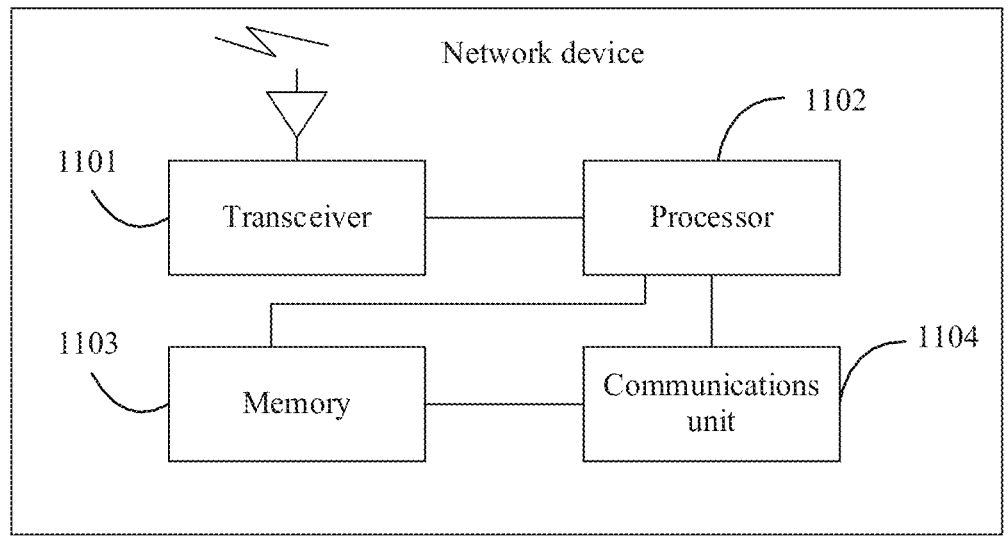
FIG. 27 is a schematic structural diagram of a network device according to an embodiment of this application.

FIG. 27 is a schematic diagram of a possible structure of the network device in the foregoing method embodiments. The network device may be a base station or another network-side device having a base station function. In the structure shown in FIG. 27, the network device includes a transceiver 1101, a processor 1102, a memory 1103, and a communications unit 1104. The transceiver 1101, the processor 1102, the memory 1103, and the communications unit 1104 are connected through a bus.

On a downlink, the transceiver 1101 adjusts to-be-sent data (for example, a PDSCH) or signaling (for example, a PDCCH) to provide an output sample and generate a downlink signal. The downlink signal is transmitted to the terminal in the foregoing embodiments through an antenna. On an uplink, an antenna receives an uplink signal transmitted by the terminal in the foregoing embodiments. The transceiver 1101 adjusts the signal received from the antenna, and provides an input sample. The processor 1102 processes service data and a signaling message, for example, modulates to-be-sent data and generates an SC-FDMA symbol. These units perform processing based on a radio access technology (for example, an access technology in an LTE system, a 5G system, and another evolved system) used by a radio access network. In this embodiment, a transmitter and a receiver are integrated into the transceiver 1101. In another embodiment, the transmitter and the receiver may alternatively be independent of each other.

The processor 1102 is further configured to control and manage the network device, to perform processing performed by the network device in the foregoing method embodiments. For example, the processor 1102 is configured to control the network device to perform downlink transmission and/or another process of the technology described in this application. As an example, the processor 1102 is configured to support the network device in performing processing procedures related to the network device in FIG. 2 to FIG. 26. When the processor 1102 is applied to a scenario of an unlicensed band, the processor 1102 further needs to control the network device to perform channel sensing, to transmit data or signaling. For example, the processor 1102 senses a channel by using a signal received by the transceiver 1101 from a transceiver apparatus or an antenna, and controls a signal to be transmitted through an antenna to preempt the channel. In different embodiments, the processor 1102 may include one or more processors, for example, one or more central processing units (CPU). The processor 1102 may be integrated into a chip, or may be a chip.

The memory 1103 is configured to store a related instruction and related data, and program code and data that are of the network device. In different embodiments, the memory 1103 includes but is not limited to a random access memory (RAM), a read-only memory (ROM), an erasable programmable read-only memory (EPROM), or a compact disc read-only memory (CD-ROM). In this embodiment, the memory 1103 is independent of the processor 1102. In another embodiment, the memory 1103 may alternatively be integrated into the processor 1102.

It may be understood that, FIG. 27 shows only a simplified design of the network device. In different embodiments, the network device may include any quantity of transmitters, receivers, processors, memories, and the like. All network devices that can implement this application fall within the protection scope of this application.

The terminal is then described by using an example. In a specific embodiment, a structure of the terminal includes a processor (or referred to as a controller), a transceiver, and a modem processor. In a possible example, the structure of the terminal may further include a memory. The memory is coupled to the processor and is configured to store a program instruction and data that are necessary for the terminal.

Figure 28:
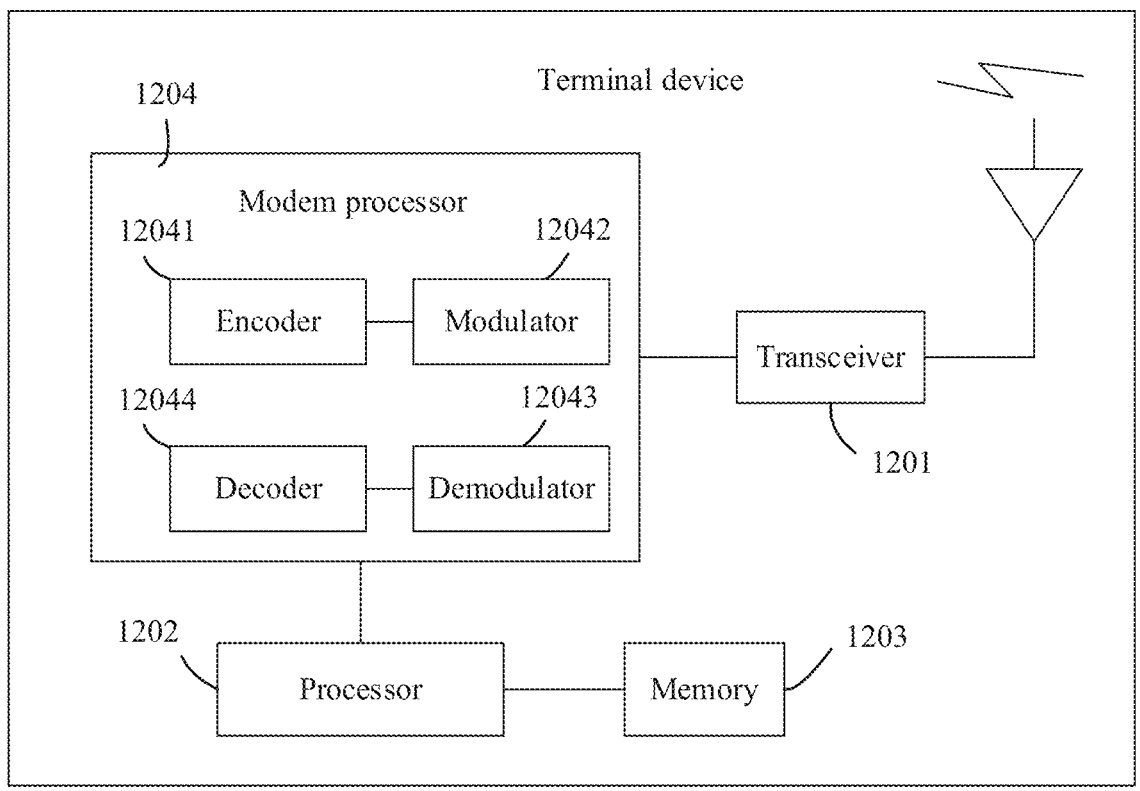
FIG. 28 is a schematic structural diagram of a terminal according to an embodiment of this application.

FIG. 28 is a simplified schematic diagram of a possible design structure of the terminal in the foregoing method embodiments. The terminal includes a transceiver 1201, a processor 1202, a memory 1203, and a modem processor 1204. The transceiver 1201, the processor 1202, the memory 1203, and the modem 1204 are connected through a bus.

The transceiver 1201 adjusts (for example, performs analog conversion, filtering, amplification, and up-conversion on) an output sample and generates an uplink signal. The uplink signal is transmitted to the network device in the foregoing embodiments through an antenna. On a downlink, an antenna receives a downlink signal from the network device in the foregoing embodiments. The transceiver 1201 adjusts (for example, performs filtering, amplification, down-conversion, and digitization on) the signal that is received through the antenna and provides an input sample. For example, in the modem processor 1204, an encoder 12041 receives service data and a signaling message that are to be sent on an uplink, and processes (for example, performs formatting, encoding, and interleaving on) the service data and the signaling message. A modulator 12042 further processes (for example, performs symbol mapping and modulation on) encoded service data and an encoded signaling message, and provides the output sample. A demodulator 12043 processes (for example, demodulates) the input sample and provides symbol estimation. A decoder 12044 processes (for example, de-interleaves and decodes) the symbol estimation and provides decoded data and a decoded signaling message that are to be sent to the terminal. The encoder 12041, the modulator 12042, the demodulator 12043, and the decoder 12044 may be implemented by the integrated modem processor 1204. These units perform processing based on a radio access technology (for example, an access technology in an LTE system, a 5G system, and another evolved system) used by a radio access network. In the embodiment shown in FIG. 28, a transmitter and a receiver are integrated into the transceiver 1201. In another embodiment, the transmitter and the receiver may alternatively be independent of each other.

The processor 1202 controls and manages the terminal, and is configured to perform processing performed by the terminal in the foregoing method embodiments. For example, the processor 1202 is configured to control the terminal to perform uplink transmission and/or another process of the technology described in this application. As an example, the processor 1202 is configured to support the terminal in performing processing procedures related to the sending device in FIG. 2 to FIG. 26, where the sending device is the terminal. For example, the transceiver 1201 is configured to control an antenna to receive a transmitted downlink signal. In different embodiments, the processor 1202 may include one or more processors, for example, one or more CPUs. The processor 1202 may be integrated into a chip, or may be a chip.

The memory 1203 is configured to store a related instruction and related data, and program code and data that are of the terminal. In different embodiments, the memory 1203 includes but is not limited to a random access memory (RAM), a read-only memory (ROM), an erasable programmable read-only memory (EPROM), or a compact disc read-only memory (CD-ROM). In this embodiment, the memory 1203 is independent of the processor 1202. In another embodiment, the memory 1203 may alternatively be integrated into the processor 1202.

It may be understood that, FIG. 28 shows only a simplified design of the terminal. In different embodiments, the network device may include any quantity of transmitters, receivers, processors, memories, and the like. All network devices that can implement this application fall within the protection scope of this application.

In a possible embodiment, this application further provides a wireless communication apparatus applied to a network device. The wireless communication apparatus includes a processor. The processor is configured to: be coupled to a memory, read an instruction in the memory, and perform, according to the instruction, operations related to the network device in the foregoing embodiments. In this embodiment, the wireless communication apparatus applied to the network device may be understood as a chip or a chip apparatus, and a memory of the wireless communication apparatus is independent of the chip.

In another possible embodiment, this application further provides another wireless communication apparatus applied to a network device. The wireless communication apparatus includes at least one processor and one memory. The memory is coupled to the at least one processor. The at least one processor is configured to perform operations related to the network device in the foregoing embodiments. In this embodiment, the wireless communication apparatus applied to the network device may be understood as a chip or a chip apparatus, and a memory of the wireless communication apparatus is integrated into the chip.

In a possible embodiment, an embodiment of this application further provides a wireless communication apparatus applied to a terminal. The wireless communication apparatus includes a processor. The processor is configured to: be coupled to a memory, read an instruction in the memory, and perform, according to the instruction, operations related to the terminal in the foregoing embodiments. In this embodiment, the wireless communication apparatus applied to the terminal may be understood as a chip or a chip apparatus, and a memory of the wireless communication apparatus is independent of the chip.

In another possible embodiment, an embodiment of this application provides a wireless communication apparatus applied to a terminal. The wireless communication apparatus includes at least one processor and one memory. The memory is coupled to the at least one processor. The at least one processor is configured to perform operations related to the terminal in the foregoing embodiments. In this embodiment, the wireless communication apparatus applied to the terminal may be understood as a chip or a chip apparatus, and a memory of the wireless communication apparatus is integrated into the chip.

All or some of the foregoing embodiments may be implemented by software, hardware, firmware, or any combination thereof. When software is used to implement the embodiments, all or some of the embodiments are implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Disk, SSD)), or the like.

A person skilled in the art should be aware that in the foregoing one or more examples, the functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any usable medium accessible to a general-purpose or special-purpose computer.

What is claimed is:

1. A contention window management method applied to an unlicensed band, comprising:
    sending, by a sending device, one or more data packets to one or more receiving devices in one reference time unit or a plurality of reference time units, wherein the one or more data packets occupy a first bandwidth;
    receiving, by the sending device from the one or more receiving devices, a hybrid automatic repeat request (HARQ) feedback or a plurality of HARQ feedbacks for the one or more data packets; and
    determining, by the sending device, a contention window (CW) size of a second bandwidth with reference to the HARQ feedback or HARQ feedbacks for the one or more data packets.

2. The method according to claim 1, wherein the determining, by the sending device, a contention window (CW) size of a second bandwidth with reference to the HARQ feedback or HARQ feedbacks for the one or more data packets comprises:
    determining the CW size of the second bandwidth based on a percentage Z of NACKs or ACKs in the HARQ feedback or HARQ feedbacks for the one or more data packets.

3. The method according to claim 2, wherein the percentage Z satisfies the following formula:

$$Z = \frac{NACK_{TB} + \sum_x Z'}{N_{TB}},$$

wherein $NACK_{TB}$ represents a quantity of TBs whose smallest feedback units are TBs and for which NACKs are fed back and that are transmitted in the one reference time unit or the plurality of reference time units, $N_{TB}$ represents a quantity of TBs transmitted in the one reference time unit or the plurality of reference time units, x represents a quantity of TBs whose smallest feedback units are CBGs and that are transmitted in the one reference time unit or the plurality of reference time units, and $$Z' = \frac{\alpha \cdot NACK_{CBG} + \beta \cdot N_{NACK}}{\alpha \cdot N_{CBG} + \beta},$$

wherein $NACK_{CBG}$ represents a quantity of CBGs for which NACKs are fed back and that are in one TB, $N_{NACK}$ represents a TB-based HARQ feedback for the TB, $N_{CBG}$ represents a quantity of CBGs in the TB, α represents a weighting factor of a CBG-based HARQ feedback, and β represents a weighting factor of a TB-based HARQ feedback.

4. The method according to claim 2, wherein the percentage Z satisfies the following formula:

$$Z = \frac{NACK_{TB} + \sum_x Z'}{N_{TB}},$$

wherein $NACK_{TB}$ represents a quantity of TBs whose smallest feedback units are TBs and that are transmitted in the one reference time unit or the plurality of reference time units and for which NACKs are fed back, $N_{TB}$ represents a quantity of TBs transmitted in the one reference time unit or the plurality of reference time units, x represents a quantity of TBs whose smallest feedback units are CBGs and that are transmitted in the one reference time unit or the plurality of reference time units, and $$Z' = \frac{\alpha \cdot NACK_{CBG}}{\alpha \cdot N_{CBG}} + \beta \cdot N_{NACK},$$

wherein $NACK_{CBG}$ represents a quantity of CBGs for which NACKs are sent and that are in the TB, $N_{NACK}$ represents a TB-based HARQ feedback for the TB, $N_{CBG}$ represents a quantity of CBGs in the TB, α represents a weighting factor of a CBG-based HARQ feedback, and β represents a weighting factor of a TB-based HARQ feedback.

5. The method according to claim 1, wherein the HARQ feedback or the plurality of HARQ feedbacks for the one or more data packets comprises or comprise one or a combination of the following:

one or more transport block (TB) HARQ-feedbacks corresponding to one or more first data packets, or one or more code block group HARQs (CBG HARQs) corresponding to one or more second data packets.

6. The method according to claim 5, wherein the percentage Z satisfies the following formula:

$$Z = \frac{NACK_{TB} + \sum_x Z'}{N_{TB}}, \text{ wherein } Z' = \frac{NACK_{CBG}}{N_{CBG}},$$

Z' represents a percentage of code block groups (CBGs) for which negative acknowledgements (NACKs) are fed back and that are in one TB, $N_{CBG}$ represents a quantity of CBGs in the TB, $NACK_{CBG}$ represents a quantity of CBGs for which NACKs are fed back and that are in the TB, $NACK_{TB}$ represents a quantity of TBs for which NACKs are fed back and that are transmitted in the one reference time unit or the plurality of reference time units, $N_{TB}$ represents a quantity of TBs transmitted in the one reference time unit or the plurality of reference time units, and x represents a total quantity of TBs whose smallest feedback units are CBGs and that are transmitted in the one reference time unit or the plurality of reference time units.

7. The method according to claim 5, wherein the HARQ feedback or HARQ feedbacks for the one or more data packets comprises or comprise one or a combination of the following HARQs: the TB HARQ or TB HARQs for the one or more first data packets, and a TB HARQ or TB HARQs converted based on the CBG HARQ or CBG HARQs for the one or more second data packets; and the percentage Z satisfies the following formula:

$$Z = \frac{NACK_{TB}}{N_{TB}},$$

wherein $NACK_{TB}$ represents a quantity of TBs for which NACKs are fed back and that are transmitted in the one reference time unit, and $N_{TB}$ represents a quantity of TBs transmitted in the one reference time unit or one of the plurality of reference time units.

8. The method according to claim 5, wherein the HARQ feedback or HARQ feedbacks for the one or more data packets comprises or comprise only the CBG HARQ or CBG HARQs for the one or more second data packets, and the percentage Z satisfies the following formula:

$$Z = \frac{NACK_{CBG}}{N_{CBG}},$$

wherein $N_{CBG}$ represents a quantity of CBGs transmitted in the one reference time unit or the plurality of reference time units, and $NACK_{CBG}$ represents a quantity of CBGs for which NACKs are fed back.

9. The method according to claim 1, wherein the determining a CW size of a second bandwidth with reference to the HARQ feedback or HARQ feedbacks for the one or more data packets comprises:
determining the CW size of the second bandwidth with reference to the HARQ feedback or HARQ feedbacks for the one or more data packets sent in the one reference time unit, wherein
the one reference time unit is a start time unit of a latest transmission performed by the sending device.

10. The method according to claim 1, wherein the determining a CW size of a second bandwidth with reference to the HARQ feedback or HARQ feedbacks for the one or more data packets comprises:
determining the CW size of the second bandwidth with reference to the HARQ feedback or HARQ feedbacks for the one or more data packets sent in the plurality of reference time units, wherein
the HARQ feedback or HARQ feedbacks for the one or more data packets comprises or comprise the HARQ feedback or HARQ feedbacks for the one or more data packets sent in the latest plurality of reference time units on non-overlapping frequency domain units.

11. A sending device, comprising a processor and a transceiver connected to the processor, wherein
the transceiver is configured to send one or more data packets to one or more receiving devices in one reference time unit or a plurality of reference time units, wherein the one or more data packets occupy a first bandwidth;
the transceiver is further configured to receive, from the one or more receiving devices, a hybrid automatic repeat request (HARQ) feedback or a plurality of HARQ feedbacks for the one or more data packets; and
the processor is configured to determine a contention window (CW) size of a second bandwidth with reference to the HARQ feedback or HARQ feedbacks for the one or more data packets.

12. The sending device according to claim 11, wherein the processor is configured to determine the CW size of the second bandwidth based on a percentage Z of NACKs or ACKs in the HARQ feedback or HARQ feedbacks for the one or more data packets.

13. The sending device according to claim 12, wherein the percentage Z satisfies the following formula:

$$Z = \frac{NACK_{TB} + \sum_x Z'}{N_{TB}},$$

wherein $NACK_{TB}$ represents a quantity of TBs whose smallest feedback units are TBs and that are transmitted in the one reference time unit or the plurality of reference time units and for which NACKs are fed back, $N_{TB}$ represents a quantity of TBs transmitted in the one reference time unit or the plurality of reference time units, x represents a quantity of TBs whose smallest feedback units are CBGs and that are transmitted in the one reference time unit or the plurality of reference time units, and $$Z' = \frac{\alpha \cdot NACK_{CBG} + \beta \cdot N_{NACK}}{\alpha \cdot N_{CBG} + \beta},$$

wherein $NACK_{CBG}$ represents a quantity of CBGs for which NACKs are sent and that are in the TB, $N_{NACK}$ represents a TB-based HARQ feedback for the TB, $N_{CBG}$ represents a quantity of CBGs in the TB, α represents a weighting factor of a CBG-based HARQ feedback, and β represents a weighting factor of a TB-based HARQ feedback.

14. The sending device according to claim 12, wherein the percentage Z satisfies the following formula:

$$Z = \frac{NACK_{TB} + \sum_x Z'}{N_{TB}},$$

wherein $NACK_{TB}$ represents a quantity of TBs whose smallest feedback units are TBs and that are transmitted in the one reference time unit or the plurality of reference time units and for which NACKs are fed back, $N_{TB}$ represents a quantity of TBs transmitted in the one reference time unit or the plurality of reference time units, x represents a quantity of TBs whose smallest feedback units are CBGs and that are transmitted in the one reference time unit or the plurality of reference time units, and $$Z' = \frac{\alpha \cdot NACK_{CBG}}{\alpha \cdot N_{CBG}} + \beta \cdot N_{NACK},$$

wherein $NACK_{CBG}$ represents a quantity of CBGs for which NACKs are fed back and that are in the TB, $N_{NACK}$ represents a TB-based HARQ feedback for the TB, $N_{CBG}$ represents a quantity of CBGs in the TB, $\alpha$ represents a weighting factor of a CBG-based HARQ feedback, and $\beta$ represents a weighting factor of a TB-based HARQ feedback.

15. The sending device according to claim 11, wherein one or more transport block (TB) HARQ feedbacks corresponding to one or more first data packets, or a HARQ feedback or HARQ feedbacks for one or more code block groups (CBG HARQ) corresponding to one or more second data packets.

16. The sending device according to claim 15, wherein the percentage Z satisfies the following formula:

$$Z = \frac{NACK_{TB} + \sum_x Z'}{N_{TB}}, \text{ wherein } Z' = \frac{NACK_{CBG}}{N_{CBG}},$$

Z' represents a percentage of code block groups (CBGs) for which negative acknowledgements (NACKs) are fed back and that are in one TB, $N_{CBG}$ represents a quantity of CBGs in the TB, $NACK_{CBG}$ represents a quantity of CBGs for which NACKs are fed back and that are in the TB, $NACK_{TB}$ represents a quantity of TBs for which NACKs are fed back and that are transmitted in the one reference time unit or the plurality of reference time units, $N_{TB}$ represents a quantity of TBs transmitted in the one reference time unit or the plurality of reference time units, and x represents a total quantity of TBs whose smallest feedback units are CBGs and that are transmitted in the one reference time unit or the plurality of reference time units.

17. The sending device according to claim 15, wherein the HARQ feedback or HARQ feedbacks for the one or more data packets comprises or comprise one or a combination of the following HARQs: the TB HARQ or TB HARQs for the one or more first data packets, and a TB HARQ or TB HARQs converted based on the CBG HARQ or CBG HARQs for the one or more second data packets; and the percentage proportion Z satisfies the following formula:

$$Z = \frac{NACK_{TB}}{N_{TB}},$$

wherein $NACK_{TB}$ represents a quantity of TBs for which NACKs are fed back and that are transmitted in the one reference time unit, and $N_{TB}$ represents a quantity of TBs transmitted in the one reference time unit or one of the plurality of reference time units.

18. The sending device according to claim 15, wherein the HARQ feedback or HARQ feedbacks for the one or more data packets comprises or comprise only the CBG HARQ or CBG HARQs for the one or more second data packets, and the percentage Z satisfies the following formula:

$$Z = \frac{NACK_{CBG}}{N_{CBG}},$$

wherein $N_{CBG}$ represents a quantity of CBGs transmitted in the one reference time unit or the plurality of reference time units, and $NACK_{CBG}$ represents a quantity of CBGs for which NACKs are fed back.

19. The sending device according to claim 11, wherein the processor is configured to:
determine the CW size of the second bandwidth with reference to the HARQ feedback or HARQ feedbacks for the one or more data packets sent in the one reference time unit, wherein
the one reference time unit is a start time unit of a latest transmission performed by the sending device.

20. The sending device according to claim 11, wherein the processor is configured to:
determine the CW size of the second bandwidth with reference to the HARQ feedback or HARQ feedbacks for the one or more data packets sent in the plurality of reference time units, wherein
the HARQ feedback or HARQ feedbacks for the one or more data packets comprises or comprise the HARQ feedback or HARQ feedbacks for the one or more data packets sent in the latest plurality of reference time units on non-overlapping frequency domain units.

\* \* \* \* \*